(12) United States Patent
Tanaka et al.

(10) Patent No.: US 11,505,872 B2
(45) Date of Patent: Nov. 22, 2022

(54) GAS PRODUCTION APPARATUS AND GAS PRODUCTION METHOD

(71) Applicant: TOKUYAMA CORPORATION, Shunan (JP)

(72) Inventors: Yasuyuki Tanaka, Shunan (JP); Yoshikazu Kodama, Shunan (JP); Daisuke Matsunaga, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 173 days.

(21) Appl. No.: 17/261,838

(22) PCT Filed: Jul. 18, 2019

(86) PCT No.: PCT/JP2019/028326
§ 371 (c)(1),
(2) Date: Jan. 20, 2021

(87) PCT Pub. No.: WO2020/022190
PCT Pub. Date: Jan. 30, 2020

(65) Prior Publication Data
US 2021/0262101 A1    Aug. 26, 2021

(30) Foreign Application Priority Data

Jul. 27, 2018   (JP) .............................. JP2018-141668

(51) Int. Cl.
*C25B 15/08*   (2006.01)
*C25B 9/23*    (2021.01)
(Continued)

(52) U.S. Cl.
CPC .............. *C25B 15/087* (2021.01); *C25B 1/04* (2013.01); *C25B 9/05* (2021.01); *C25B 9/13* (2021.01);
(Continued)

(58) Field of Classification Search
CPC ......... C25B 15/087; C25B 9/15; C25B 15/08; C25B 9/13; C25B 9/23
See application file for complete search history.

(56) References Cited

U.S. PATENT DOCUMENTS 4,294,683 A * 10/1981  Pere ........................ C25B 15/02
                                                                    204/266
4,323,442 A    4/1982  Lantin et al.
(Continued)

FOREIGN PATENT DOCUMENTS

JP        56-108889 A      8/1981
JP        10330980 A  *   12/1998
(Continued)

OTHER PUBLICATIONS

International Search Report for PCT/JP2019/028326 (PCT/ISA/210) dated Sep. 10, 2019.
(Continued)

*Primary Examiner* — Brian W Cohen
(74) *Attorney, Agent, or Firm* — Birch, Stewart, Kolasch & Birch, LLP

(57) ABSTRACT

A gas production apparatus including: an electrolysis vessel; first and second electrolyte circulation systems; and an electrolyte exchanger, the first/second electrolyte circulation system including: a first/second circulation tank receiving and storing a first/second electrolyte flowing out from an anode chamber/a cathode chamber; and a first/second circulation pump supplying the first/second electrolyte to the anode chamber/the cathode chamber, the electrolyte exchanger transferring part of the first electrolyte existing in the first electrolyte circulation system into the second electrolyte circulation system on one hand, and transferring part
(Continued)

of the second electrolyte existing in the second electrolyte circulation system into the first electrolyte circulation system on the other hand.

13 Claims, 9 Drawing Sheets

(51) Int. Cl.
  *C25B 9/05* (2021.01)
  *C25B 1/04* (2021.01)
  *C25B 15/023* (2021.01)
  *C25B 9/13* (2021.01)
(52) U.S. Cl.
  CPC .............. *C25B 9/23* (2021.01); *C25B 15/023* (2021.01); *C25B 15/08* (2013.01)

(56) References Cited

U.S. PATENT DOCUMENTS 10,590,552 B2 * 3/2020 Harano ............... H01M 8/0656
2018/0195183 A1 7/2018 Domon et al.
2018/0334751 A1 11/2018 Manabe
2020/0157694 A1 * 5/2020 Manabe .................. C25B 15/02
2021/0172074 A1 * 6/2021 Hahn ...................... C25B 13/00

FOREIGN PATENT DOCUMENTS

| JP | 2007-100204 | A | 4/2007 |
| JP | 2015-59263 | A | 3/2015 |
| JP | 6008482 | B2 | 10/2016 |
| JP | 2017-39982 | A | 2/2017 |
| JP | 2017-119895 | A | 7/2017 |
| JP | 2017-179557 | A | 10/2017 |
| JP | 2017-203218 | A | 11/2017 |

OTHER PUBLICATIONS

Written Opinion of the International Searching Authority for PCT/JP2019/028326 (PCT/ISA/237) dated Sep. 10, 2019.

* cited by examiner

GAS PRODUCTION APPARATUS AND GAS PRODUCTION METHOD

FIELD

The present invention relates to a gas production method and a gas production apparatus according to the alkaline water electrolysis method, and particularly relates to a gas production method and a gas production apparatus preferable in alkaline water electrolysis under pressurized conditions.

BACKGROUND

The alkaline water electrolysis method is known as a method for producing hydrogen gas and oxygen gas. In the alkaline water electrolysis method, water is electrolyzed using a basic aqueous solution (alkaline water) containing a dissolved alkali metal hydroxide (such as NaOH and KOH) as an electrolyte, to generate hydrogen gas at a cathode and oxygen gas at an anode. An electrolytic cell for alkaline water electrolysis usually includes an anode chamber and a cathode chamber separated by an ion-permeable separating membrane, and water is electrolyzed as the electrolyte is circulated through each of the anode and cathode chambers. The electrolyte recovered from each chamber is once collected and stored in a circulation tank, and the electrolyte stored in the circulation tank is supplied to each chamber again.

CITATION LIST

Patent Literature

Patent Literature 1: JP 2017-039982 A
Patent Literature 2: JP 6008482 B2
Patent Literature 3: JP 2017-119895 A
Patent Literature 4: JP 2017-203218 A
Patent Literature 5: JP 2017-179557 A

SUMMARY

Technical Problem

There is a problem of a remaining dissolved gas in a production process of hydrogen gas and oxygen gas using alkaline water electrolysis. That is, part of oxygen gas generated by the anode reaction remains dissolved in the electrolyte recovered from the anode chamber, and part of hydrogen gas generated by the cathode reaction remains dissolved in the electrolyte recovered from the cathode chamber. The electrolyte recovered from the anode chamber and the electrolyte recovered from the cathode chamber are mixed in the circulation tank, which results in both oxygen gas and hydrogen gas remaining dissolved in the electrolyte in the circulation tank. The oxygen gas and hydrogen gas remaining dissolved in the electrolyte in the circulation tank are gradually released into a gas phase, which leads to gradual increase in the concentrations of oxygen gas and hydrogen gas in a gas phase part in an upper part of the circulation tank. Therefore, the gas composition of the gas phase part in the upper part of the circulation tank may reach a flammability limit while the electrolysis apparatus is continuously operated. Particularly in an apparatus for high-pressure alkaline water electrolysis under pressurized conditions, since the pressure inside the chambers of the electrolysis vessel and the pressure of the gas and electrolyte recovered from the electrolysis vessel are kept higher than atmospheric pressure, the amount of a gas remaining dissolved in the electrolyte increases more than at atmospheric pressure, which makes the problem of a remaining dissolved gas significant.

As to an electrolytic process of generating hydrogen gas, for example, Patent Literature 1 describes an electrolytic apparatus comprising: an anode chamber that houses an anode to generate anode gas; a cathode chamber that houses a cathode to generate hydrogen gas; a diaphragm that separates the anode chamber and the cathode chamber; and an anode side circulation line that discharges an electrolyte from the anode chamber and returns the electrolyte to the anode chamber, wherein the anode side circulation line includes: an anode side gas-liquid separation unit that separates the anode gas from the electrolyte; an anode side discharge line that connects the anode chamber to the anode side gas-liquid separation unit, discharges the electrolyte and the anode gas from the anode chamber, and feeds the electrolyte and the anode gas to the anode side gas-liquid separation unit; and an anode side supplying line that connects the anode chamber to the anode side gas-liquid separation unit, discharges the electrolyte from the anode side gas-liquid separation unit, and feeds the electrolyte to the anode chamber, the electrolytic apparatus further comprises an anode gas feeding line that connects the anode side gas-liquid separation unit to a gas phase part in which the anode gas is mixed with hydrogen gas derived from the dissolved hydrogen gas and existing as a gas phase, the anode gas feeding line feeding at least part of the anode gas to the gas phase part, and the concentration of the hydrogen gas in the gas phase part is less than a lower limit value of an explosion limit. Patent Literature 1 insists that the possibility of reaching the explosion limit of hydrogen by gradual accumulation of the gas by very small amount in the circulation line of the electrolyte in an electrolytic process of generating hydrogen can be surely removed.

Patent Literature 1 however describes that the gas discharged from the gas phase part of a circulation tank is released outside the system as an exhaust gas. In Patent Literature 1, since the gas in the gas phase part of the circulation tank is purged using the anode gas, the gas discharged from the gas phase part of the circulation tank includes the cathode gas released into the gas phase part from the electrolyte in the circulation tank mixed with the anode gas supplied to the gas phase part. Thus, it is difficult to obtain an anode gas of high purity even if the gas discharged from the gas phase part of the circulation tank is recovered in Patent Literature 1.

One may also consider, as a means for solving such a problem, recovering and storing the electrolyte recovered from the anode chamber and the electrolyte recovered from the cathode chamber in separate circulation tanks respectively. That is, one may consider that the electrolyte recovered from the anode chamber may be recovered and stored in an anode side circulation tank, and the electrolyte stored in the anode side circulation tank may be supplied to the anode chamber; and the electrolyte recovered from the cathode chamber may be recovered and stored in a cathode side circulation tank, and the electrolyte stored in the cathode side circulation tank may be supplied to the cathode chamber. In an electrolytic process of an alkaline water, however, the anode reaction is represented by

$$2OH^- \rightarrow \tfrac{1}{2}O_2\uparrow + H_2O + 2e^- \tag{1}$$

and the cathode reaction is represented by

$$2H_2O + 2e^- \rightarrow H_2\uparrow + 2OH^- \tag{2}.$$

Thus, in the electrolytic process of an alkaline water, while water is consumed as a whole, the cathode reaction consumes water on one hand and the anode reaction generates water on the other hand, which causes the difference in liquid level between the anode side circulation tank and the cathode side circulation tank as the electrolysis reaction proceeds. Since the anode reaction consumes an OH⁻ ion and the cathode reaction generates an OH⁻ ion, ions pass through the separating membrane to move so that charge neutrality between the anode and cathode chambers is kept. However, not all the OH⁻ ions generated by the cathode reaction move from the cathode chamber to the anode chamber. That is, usually, only a part of the OH⁻ ions generated by the cathode reaction passes through the separating membrane to move from the cathode chamber to the anode chamber, and excessive negative charge in the cathode chamber which corresponds to the rest thereof is compensated by a cation (Na⁺ ion when a solute in the alkaline water is NaOH, and K⁺ ion when a solute in the alkaline water is KOH) passing through the separating membrane and moving from the anode chamber to the cathode chamber. This causes the difference in the concentration of the electrolyte between the anode side circulation tank and the cathode side circulation tank as the electrolysis reaction proceeds.

In a low-pressure (atmospheric pressure) process, even when the anode side circulation line and the cathode side circulation line are separated, a pipe (communicating pipe) communicating a liquid phase part of the anode side circulation tank and a liquid phase part of the cathode side circulation tank is further disposed, which allows water and ions to move through the communicating pipe according to gravity and the diffusion law so that unevenness is relieved. This automatically solves the differences in liquid level and in concentration between the anode side circulation tank and the cathode side circulation tank, or reduces such differences to a certain level or below. Generally, however, pressure difference is dominant in a high-pressure electrolysis process under pressurized conditions compared to gravity. Thus, when the anode side circulation line and the cathode side circulation line are separated and thereafter the communicating pipe is disposed between the liquid phase part of the anode side circulation tank and the liquid phase part of the cathode side circulation tank as described above in the high-pressure process, the electrolyte moves from the circulation tank on a higher pressure side to the circulation tank on a lower pressure side due to the pressure difference between the anode side circulation line and the cathode side circulation line, which changes the liquid levels of both the circulation tanks. This, in an extreme case, may make the electrolyte overflow the circulation tank on the lower pressure side, which makes it necessary to stop the operation of the electrolysis apparatus.

An object of the present invention is to provide a gas production apparatus capable of preventing the gas composition in a gas phase part of a circulation tank from reaching a flammability limit and capable of stably producing both hydrogen gas and oxygen gas while reducing a bad effect of a remaining dissolved gas in an electrolyte on gas purity, even in alkaline water electrolysis under pressurized conditions. The present invention also provides a gas production method capable of preventing the gas composition in a gas phase part of a circulation tank from reaching a flammability limit and capable of stably producing both hydrogen gas and oxygen gas while reducing a bad effect of a remaining dissolved gas in an electrolyte on gas purity, even in alkaline water electrolysis under pressurized conditions.

Solution to Problem

The present invention encompasses the following aspects [1] to [14].

[1] A gas production apparatus comprising:
an electrolysis vessel comprising an anode chamber, a cathode chamber, and an ion-permeable separator membrane separating the anode chamber and the cathode chamber, the anode chamber housing an anode and generating oxygen gas, the cathode chamber housing a cathode and generating hydrogen gas;
a first electrolyte circulation system;
a second electrolyte circulation system; and
an electrolyte exchanger,
the first electrolyte circulation system comprising:
a first circulation tank receiving and storing a first electrolyte flowing out from the anode chamber; and
a first circulation pump supplying the first electrolyte stored in the first circulation tank to the anode chamber,
the second electrolyte circulation system comprising:
a second circulation tank receiving and storing a second electrolyte flowing out from the cathode chamber; and
a second circulation pump supplying the second electrolyte stored in the second circulation tank to the cathode chamber,
the electrolyte exchanger transferring part of the first electrolyte existing in the first electrolyte circulation system into the second electrolyte circulation system on one hand, and transferring part of the second electrolyte existing in the second electrolyte circulation system into the first electrolyte circulation system on the other hand.

[2] The gas production apparatus according to [1], further comprising:
a first pipe connecting an outlet of the first circulation pump and an inlet of the anode chamber; and
a second pipe connecting an outlet of the second circulation pump and an inlet of the cathode chamber, the second electrolyte flowing in the second pipe,
the electrolyte exchanger comprising:
a first electrolyte transferor transferring part of the first electrolyte stored in the first circulation tank into the second circulation tank; and
a second electrolyte transferor transferring part of the second electrolyte from the second pipe into the first pipe.

[3] The gas production apparatus according to [1], further comprising:
a first pipe connecting an outlet of the first circulation pump and an inlet of the anode chamber, the first electrolyte flowing in the first pipe; and
a second pipe connecting an outlet of the second circulation pump and an inlet of the cathode chamber,
the electrolyte exchanger comprising:
a first electrolyte transferor transferring part of the second electrolyte stored in the second circulation tank into the first circulation tank; and
a second electrolyte transferor transferring part of the first electrolyte from the first pipe into the second pipe.

[4] The gas production apparatus according to any one of [1] to [3], further comprising:
a first pressure regulator valve regulating a pressure of a first gas stream flowing out from the anode chamber; and
a second pressure regulator valve regulating a pressure of a second gas stream flowing out from the cathode chamber.

[5] The gas production apparatus according to [4], further comprising:
a first cooler receiving and cooling the first gas stream;
a second cooler receiving and cooling the second gas stream;
a first filter being connected with the first cooler, receiving the first gas stream cooled by the first cooler, and removing a liquefied moisture in the first gas stream; and
a second filter being connected with the second cooler, receiving the second gas stream cooled by the second cooler, and removing a liquefied moisture in the second gas stream,
wherein the first cooler and the first filter are arranged on an upstream side of the first pressure regulator valve; and
the second cooler and the second filter are arranged on an upstream side of the second pressure regulator valve.

[6] The gas production apparatus according to [4] or [5], further comprising:
a differential pressure regulator regulating a pressure difference between the pressure of the first gas stream on the upstream side of the first pressure regulator valve and the pressure of the second gas stream on the upstream side of the second pressure regulator valve to a predetermined value.

[7] The gas production apparatus according to [6], the differential pressure regulator comprising:
a differential pressure detector measuring the pressure difference between the pressure of the first gas stream on the upstream side of the first pressure regulator valve and the pressure of the second gas stream on the upstream side of the second pressure regulator valve; and
a valve controller controlling the first pressure regulator valve and/or the second pressure regulator valve based on a result of the measurement by the differential pressure detector.

[8] A gas production method for producing oxygen gas and hydrogen gas, the method comprising electrolyzing an electrolyte which is an alkaline water by means of an electrolysis vessel, the electrolysis vessel comprising an anode chamber, a cathode chamber, and an ion-permeable separator membrane separating the anode chamber and the cathode chamber, the anode chamber housing an anode and generating oxygen gas, the cathode chamber housing a cathode and generating hydrogen gas,
the method comprising:
(a) applying an electric current between the anode and the cathode while supplying a first electrolyte to the anode chamber and a second electrolyte to the cathode chamber respectively, to generate oxygen gas from the anode and hydrogen gas from the cathode respectively;
(b) recovering a first gas stream and the first electrolyte from the anode chamber, the first gas stream comprising oxygen gas;
(c) recovering a second gas stream and the second electrolyte from the cathode chamber, the second gas stream comprising hydrogen gas;
(d) storing the first electrolyte recovered from the anode chamber in a first circulation tank;
(e) storing the second electrolyte recovered from the cathode chamber in a second circulation tank;
(f) pumping the first electrolyte stored in the first circulation tank to the anode chamber by means of a first circulation pump;
(g) pumping the second electrolyte stored in the second circulation tank to the cathode chamber by means of a second circulation pump;
(h) introducing part of the first electrolyte into the second electrolyte; and
(i) introducing part of the second electrolyte into the first electrolyte.

[9] The method according to [8],
the (h) comprising:
transferring part of the first electrolyte stored in the first circulation tank into the second circulation tank,
the (i) comprising:
making part of the second electrolyte pumped out from the second circulation pump join the first electrolyte pumped out from the first circulation pump.

[10] The method according to [8],
the (h) comprising:
making part of the first electrolyte pumped out from the first circulation pump join the second electrolyte pumped out from the second circulation pump,
the (i) comprising:
transferring part of the second electrolyte stored in the second circulation tank into the first circulation tank.

[11] The method according to any one of [8] to [10], further comprising:
(j) regulating a pressure of the first gas stream recovered from the anode chamber, by means of a first pressure regulator valve arranged in a flow path of the first gas stream; and
(k) regulating a pressure of the second gas stream recovered from the cathode chamber, by means of a second pressure regulator valve arranged in a flow path of the second gas stream.

[12] The method according to [11], further comprising:
(l) cooling the first gas stream;
(m) cooling the second gas stream;
(n) removing a moisture condensed in the (l) from the first gas stream after the (l); and
(o) removing a moisture condensed in the (m) from the second gas stream after the (m),
the (j) comprising:
regulating the pressure of the first gas stream after the (l) and the (n) by means of the first pressure regulator valve,
the (k) comprising:
regulating the pressure of the second gas steam after the (m) and the (o) by means of the second pressure regulator valve.

[13] The method according to [11] or [12], further comprising:
(p) regulating a pressure difference between the pressure of the first gas stream on an upstream side of the first pressure regulator valve and the pressure of the second gas stream on an upstream side of the second pressure regulator valve to be a predetermined value.

[14] The method according to [13],
the (p) comprising:
(p1) measuring the pressure difference between the pressure of the first gas stream on the upstream side of the first pressure regulator valve and the pressure of the second gas stream on the upstream side of the second pressure regulator valve; and
(p2) controlling the first pressure regulator valve and/or the second pressure regulator valve in the (j) and (k), based on a result of the measurement of the (p1).

[15] The method according to any one of [8] to [14], wherein a pressure inside the cathode chamber is maintained higher than an atmospheric pressure by no less than 20 kPa.

[16] The method according to any one of [8] to [15], wherein a pressure inside the anode chamber is maintained higher than an atmospheric pressure by no less than 20 kPa.

Advantageous Effects of Invention

The gas production apparatus according to the present invention separately comprises the first electrolyte circulation system that supplies the first electrolyte to and circulates the first electrolyte through the anode chamber, and the second electrolyte circulation system that supplies the second electrolyte to and circulates the second electrolyte through the cathode chamber. Thus, the gas production apparatus according to the present invention is capable of preventing the gas compositions in the gas phase parts of the circulation tanks from reaching the flammability limits and is capable of producing both hydrogen gas and oxygen gas, while reducing a bad effect of a remaining dissolved gas in the electrolyte on gas purity, even in alkaline water electrolysis under pressurized conditions. The gas production apparatus according to the present invention further comprises the electrolyte exchanger that transfers part of the first electrolyte existing in the first electrolyte circulation system into the second electrolyte circulation system on one hand, and transfers part of the second electrolyte existing in the second electrolyte circulation system into the first electrolyte circulation system on the other hand, which makes it possible to solve or reduce the differences in liquid level and in concentration between the anode side circulation tank and the cathode side circulation tank irrespective of the pressure difference between the first electrolyte circulation system and the second electrolyte circulation system. Thus, the gas production apparatus according to the present invention is capable of stably producing each gas even in alkaline water electrolysis under pressurized conditions. Therefore, the gas production apparatus according to the present invention is capable of preventing the gas compositions in the gas phase parts of the circulation tanks from reaching the flammability limits, and is capable of stably producing both hydrogen gas and oxygen gas, while reducing a bad effect of a remaining dissolved gas in the electrolyte on gas purity, even in alkaline water electrolysis under pressurized conditions.

The gas production method according to the present invention comprises the steps (b) to (g). Thus, the first electrolyte recovered from the anode chamber is stored in the first circulation tank, and the first electrolyte stored in the first circulation tank is supplied to the anode chamber by means of the first circulation pump; and the second electrolyte recovered from the cathode chamber is stored in the second circulation tank, and the second electrolyte stored in the second circulation tank is supplied to the cathode chamber by means of the second circulation pump. Therefore, the gas production method according to the present invention is capable of preventing the gas compositions in the gas phase parts of the circulation tanks from reaching the flammability limits, and is capable of producing both hydrogen gas and oxygen gas, while reducing a bad effect of a remaining dissolved gas in the electrolyte on gas purity, even in alkaline water electrolysis under pressurized conditions. The gas production method according to the present invention further comprises the steps (h) and (i), which makes it possible to solve or reduce the differences in liquid level and in concentration between the first circulation tank and the second circulation tank irrespective of the pressure difference between the electrolyte circulation system on the anode side and the electrolyte circulation system on the cathode side. Thus, the gas production method according to the present invention is capable of stably producing each gas even in alkaline water electrolysis under pressurized conditions. Therefore, the gas production method according to the present invention is capable of preventing the gas compositions in the gas phase parts of the circulation tanks from reaching the flammability limits, and is capable of stably producing both hydrogen gas and oxygen gas, while reducing a bad effect of a remaining dissolved gas in the electrolyte on gas purity, even in alkaline water electrolysis under pressurized conditions.

DETAILED DESCRIPTION OF EMBODIMENTS

Figure 1:
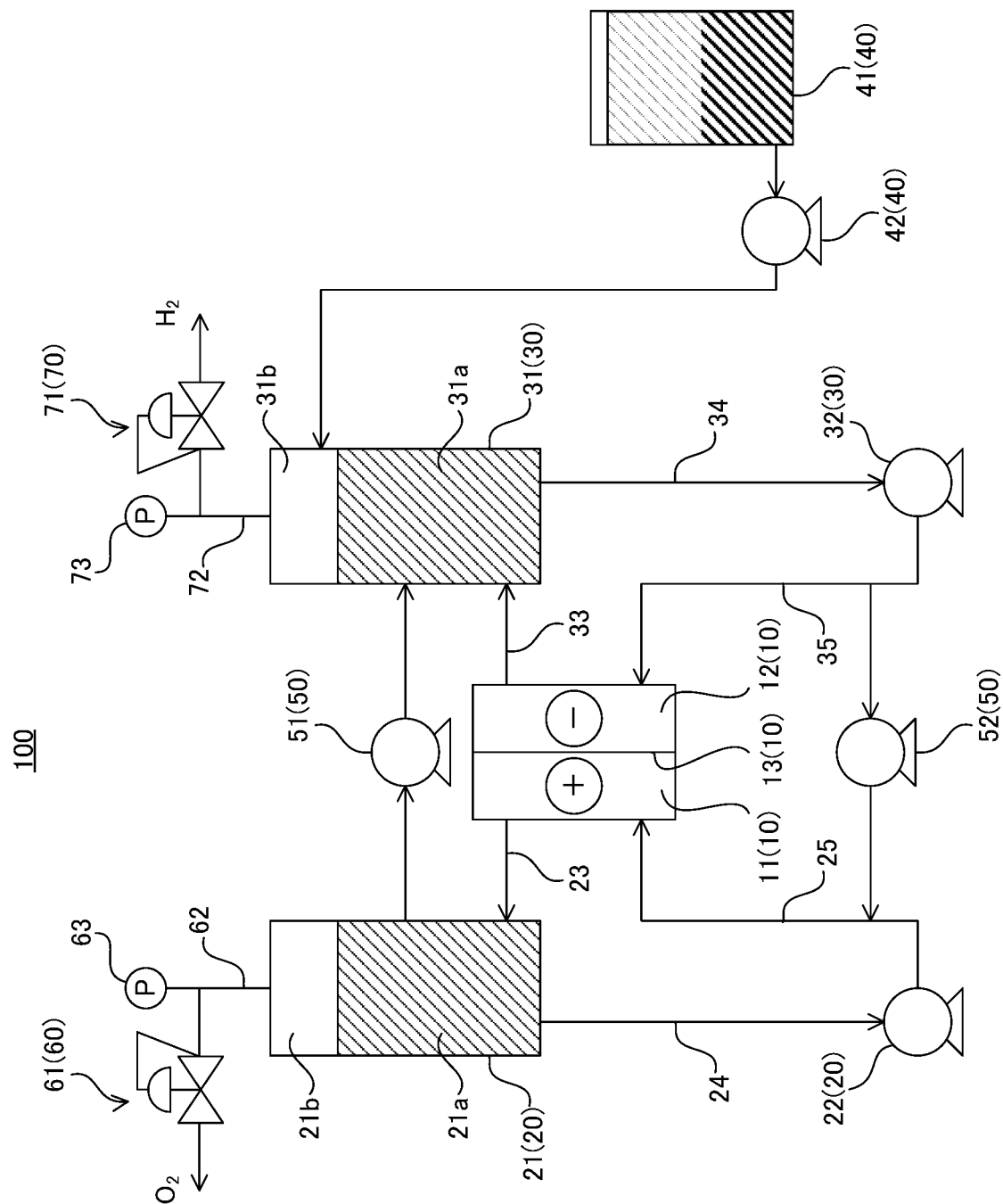
FIG. 1 is an explanatory schematic view of a gas production apparatus 100 according to one embodiment of the present invention.

The foregoing effects and advantages of the present invention will be made clear from the following description of the embodiments. Hereinafter the embodiments of the present invention will be described with reference to the drawings. The present invention is not limited to these embodiments. The measures in the drawings do not always represent the exact measures. Some reference signs may be omitted in the drawings. In the present description, expression "A to B" concerning numeral values A and B shall mean "no less than A and no more than B" unless otherwise specified. In such expression, if a unit is added only to the numeral value B, this unit shall be applied to the numeral value A as well. A word "or" shall mean a logical sum unless otherwise specified. In the present description, expression "$E_1$ and/or $E_2$" concerning elements $E_1$ and $E_2$ means "$E_1$, or $E_2$, or the combination thereof", and expression "$E_1, \ldots, E_{N-1}$, and/or $E_N$" concerning elements $E_1, \ldots, E_N$ (N is an integer of 3 or more) means "$E_1, \ldots, E_{N-1}$, or $E_N$, or any combination thereof".

<1. Gas Production Apparatus (1)>

FIG. 1 is an explanatory schematic view of a gas production apparatus 100 according to one embodiment of the present invention. The gas production apparatus 100 is to produce oxygen gas and hydrogen gas by alkaline water electrolysis using an alkaline water as an electrolyte. The gas production apparatus 100 comprises an electrolysis vessel 10, a first electrolyte circulation system 20, a second electrolyte circulation system 30, a pure water supply system 40, an electrolyte exchanger 50, a first gas recovery line 60, and a second gas recovery line 70. In FIG. 1, the arrows point directions where substances flow.

The electrolysis vessel 10 comprises an anode chamber 11 housing an anode to generate oxygen gas, a cathode chamber 12 housing a cathode to generate hydrogen gas, and an ion-permeable separating membrane 13 separating the anode chamber 11 and the cathode chamber 12. Any electrolysis vessel conventionally used for apparatuses for alkaline water electrolysis may be employed for the electrolysis vessel 10 without particular limitations.

The first electrolyte circulation system 20 comprises a first circulation tank 21 receiving a first electrolyte flowing out from the anode chamber 11 to store the first electrolyte therein, and a first circulation pump 22 supplying the first electrolyte stored in the first circulation tank 21 to the anode chamber 11. A liquid phase part 21a occupied by the stored first electrolyte, and a gas phase part 21b that is a space over the liquid phase part 21a are present inside the first circulation tank 21. The first electrolyte circulation system 20 further comprises a pipe 23 introducing the first electrolyte and anode gas which flow out from the anode chamber 11 to the first circulation tank 21, a pipe 24 guiding the first electrolyte from the liquid phase part 21a of the first circulation tank 21 to the first circulation pump 22, and a first pipe 25 introducing the first electrolyte pumped out from the first circulation pump 22 to the anode chamber 11.

A first gas-liquid mixture containing gas generated in the anode chamber 11, and the first electrolyte flows out from the anode chamber 11. The first gas-liquid mixture flowing out from the anode chamber 11 is introduced to the first circulation tank 21 through the pipe 23. In the first circulation tank 21, the first gas-liquid mixture is separated into the first electrolyte to be in the liquid phase part 21a, and the gas (first gas stream) to be in the gas phase part 21b, respectively (gas-liquid separation).

The second electrolyte circulation system 30 comprises a second circulation tank 31 receiving a second electrolyte flowing out from the cathode chamber 12 to store the second electrolyte therein, and a second circulation pump 32 supplying the second electrolyte stored in the second circulation tank 31 to the cathode chamber 12. A liquid phase part 31a occupied by the stored second electrolyte, and a gas phase part 31b that is a space over the liquid phase part 31a are present inside the second circulation tank 31. The second electrolyte circulation system 30 further comprises a pipe 33 introducing the second electrolyte and cathode gas which flow out from the cathode chamber 12 to the second circulation tank 31, a pipe 34 guiding the second electrolyte from the liquid phase part 31a of the second circulation tank 31 to the second circulation pump 32, and a second pipe 35 introducing the second electrolyte pumped out from the second circulation pump 32 to the cathode chamber 12.

A second gas-liquid mixture containing gas generated in the cathode chamber 12, and the second electrolyte flows out from the cathode chamber 12. The second gas-liquid mixture flowing out from the cathode chamber 12 is introduced to the second circulation tank 31 through the pipe 33. In the second circulation tank 31, the second gas-liquid mixture is separated into the second electrolyte to be in the liquid phase part 31a, and the gas (second gas stream) to be in the gas phase part 31b, respectively (gas-liquid separation).

The pure water supply system 40 has a pure water tank 41 to store pure water therein, and a water supply pump 42 to pump the pure water stored in the pure water tank 41 to the second circulation tank 31. The pure water is pumped by means of the water supply pump 42 from the pure water tank 41 to the second circulation tank 31, which replaces water consumed by the water electrolysis reaction in the electrolysis vessel 10 with the pure water.

The electrolyte exchanger 50 comprises a first electrolyte transferor 51 and a second electrolyte transferor 52. The first electrolyte transferor 51 feeds part of the first electrolyte stored in the first circulation tank 21 into the second circulation tank 31. The second electrolyte transferor 52 feeds part of the second electrolyte flowing in the second pipe 35 connecting an outlet of the second circulation pump 32 and an inlet of the cathode chamber 12 into the first pipe 25 connecting an outlet of the first circulation pump 22 and an inlet of the anode chamber 11. In one embodiment, for example, any known pumps such as positive displacement pumps and non-positive displacement pumps can be used as the first electrolyte transferor 51 and the second electrolyte transferor 52.

Examples of positive displacement pumps include plunger pumps, piston pumps, diaphragm pumps, and gear pumps. Examples of non-positive displacement pumps include centrifugal pumps and turbine pumps. The combination of a non-positive displacement pump with a controller controlling the flow rate is capable of feeding the electrolyte in a given direction at a given flow rate even when the non-positive displacement pump is used.

The amount of the electrolyte transferred by the first electrolyte transferor 51 and the amount of the electrolyte transferred by the second electrolyte transferor 52 in the electrolyte exchanger 50, and the amount of the pure water pumped in the pure water supply system 40 are adjusted so that the amount (liquid level) and the concentration of the first electrolyte stored in the first circulation tank 21, and the amount (liquid level) and the concentration of the second electrolyte stored in the second circulation tank 31 are kept at a certain level.

A condition under which the amount and the concentration of the electrolyte are in a steady state, that is, a condition under which the amount and the concentration of the electrolyte in each of the first electrolyte circulation system 20 and the second electrolyte circulation system 30 are kept at a certain level is that the time derivatives of the amount (volume) and the $OH^-$ ion content of the electrolyte in each of the first electrolyte circulation system 20 and the second electrolyte circulation system 30 are all 0, which are represented by the following four equations. It is noted that dissociation equilibrium of water was ignored in the equations as an approximation, since the concentrations of the electrolytes (alkaline water) in each of the first electrolyte circulation system 20 and the second electrolyte circulation system 30 are sufficiently high. Moisture leaving the systems as mist or water vapor in the gases from the first circulation tank 21 and the second circulation tank 31 via the first gas recovery line 60 and the second gas recovery line 70 is also ignored.

$$0 = dV_1/dt = -w_{c1} - v_{12} + v_{21} \tag{3}$$

$$0 = dV_2/dt = -w_{c2} + v_{12} - v_{21} + w_{s2} \tag{4}$$

$$0 = dN_1/dt = n_{f1} + n_{p21} - v_{12} \cdot C_1 + v_{21} \cdot C_2 \tag{5}$$

$$0 = dN_2/dt = n_{f2} - n_{p21} + v_{12} \cdot C_1 - v_{21} \cdot C_2 \tag{6}$$

(in the equations, $V_1$: amount of the electrolyte in the first electrolyte circulation system 20 [L];

$V_2$: amount of the electrolyte in the second electrolyte circulation system 30 [L];

$N_1$: OH⁻ ion content of the first electrolyte circulation system 20 [mol];

$N_2$: OH⁻ ion content of the second electrolyte circulation system 30 [mol];

$w_{c1}$: water consumption per unit time in the anode chamber [L/s] (negative number if water is generated);

$w_{c2}$: water consumption per unit time in the cathode chamber [L/s];

$w_{s2}$: water supply to the second circulation tank 31 by the pure water supply system 40 per unit time [L/s];

$n_{f1}$: amount of OR ion generation per unit time in the anode chamber [mol/s] (negative number if an OH⁻ ion is consumed);

$n_{f2}$: amount of OH⁻ ion generation per unit time in the cathode chamber [mol/s];

$n_{p21}$: amount of an OH⁻ ion passing through the separating membrane 13 and moving from the cathode chamber 12 to the anode chamber 11 per unit time [mol/s];

$v_{12}$: amount of the electrolyte transferred from the first electrolyte circulation system 20 to the second electrolyte circulation system 30 by the electrolyte exchanger 50 per unit time [L/s]; and $v_{21}$: amount of the electrolyte transferred from the second electrolyte circulation system 30 to the first electrolyte circulation system 20 by the electrolyte exchanger 50 per unit time [L/s].)

In the gas production apparatus 100, $v_{12}$ means the same as the amount of the electrolyte transferred by the first electrolyte transferor 51, and $v_{21}$ means the same as the amount of the electrolyte transferred by the second electrolyte transferor 52.

The equations (3) to (6) are solved. First, $$w_{s2}=w_{c1}+w_{c2} \tag{7}$$

is obtained from the equation (3)+the equation (4). That is, the water supply by the pure water supply system 40 has only to be equal to the water consumption in the electrolysis vessel 10.

$$\text{Next, } v_{12}-v_{21}=-w_{c1} \tag{8}$$

is obtained from the equation (4)−the equation (3).

$$n_{f1}+n_{f2}=0 \tag{9}$$

is obtained from the equation (5)+the equation (6). This is always satisfied (see the equations (1) and (2)).

$$n_{f2}-n_{f1}-2n_{p21}+2(v_{12} \cdot C_1-v_{21} \cdot C_2)=0$$

is obtained from the equation (6)−the equation (5). Since $n_{f1}=-n_{f2}$ based on the equation (9), $$n_{f2}-n_{p21}+v_{12} \cdot C_1-v_{21} \cdot C_2=0 \tag{10}$$

If all the OH⁻ ions generated in the cathode chamber 12 passed through the separating membrane 13 to move to the anode chamber 11, $n_{p21}$ would be equal to $n_{f2}$. Actually, however, the OH⁻ ions do not do so as described above, and thus $0<n_{p21}<n_{f2}$. Thus, $n_{p21}$ can be represented as:

$$n_{p21}=\alpha \cdot n_{f2} \tag{11}$$

using a dimensionless number α ($0<\alpha<1$. Hereinafter this may be referred to as "OH⁻ permeability α"). From the equation (10), $$(1-\alpha)n_{f2}-v_{12} \cdot C_1-v_{21} \cdot C_2=0 \tag{10'}$$

$$v_{12}=\{(1-\alpha)n_{f2}-w_{c1} \cdot C_2\}/(C_2-C_1) \tag{12}$$

is obtained by eliminating $v_{21}$ using the equation (8). From the equation (8), $$v_{21}=\{(1-\alpha)n_{f2}-w_{c1} \cdot C_1\}/(C_2-C_1) \tag{13}$$

Here, $n_{f2}$, $w_{c1}$ and $w_{c2}$ can be represented as:

$$n_{f2}=n_e \tag{14}$$

$$w_{c1}=(18/1000)\times(-\tfrac{1}{2})n_e=-0.009n_e \tag{15, and}$$

$$w_{c2}=(18/1000)\times n_e=0.018n_e \tag{16}$$

using the amount $n_e$ of electrons involved in the cathode reaction per unit time [mol/s]. It is noted that the water density at the temperature of the electrolyte during the operation of the gas production apparatus 100 was regarded as 1000 g/L in the equations as an approximation. By substituting the equations (14) to (16) into the equations (12), (13), (7) and (8), $$v_{12}=\{(1-\alpha)n_e+0.009n_e \cdot C_2\}/(C_2-C_1) \tag{12'}$$

$$v_{21}=\{(1-\alpha)n_e+0.009n_e \cdot C_1\}/(C_2-C_1) \tag{13'}$$

$$w_{s2}=0.009n_e \tag{7', and}$$

$$v_{12}=v_{21}+0.009n_e \tag{8'}$$

are obtained. The left sides of the equations (12') and (13') ($v_{12}$ and $v_{21}$) take positive numbers, and the numerators in the right sides thereof are always positive numbers. Thus, $C_2>C_1$ holds in the denominators in the right sides thereof. That is, in the steady state, the concentration $C_2$ of the electrolyte in the second electrolyte circulation system 30 (that is, the concentration of the second electrolyte) is kept higher than the concentration $C_1$ of the electrolyte in the first electrolyte circulation system 20 as a whole (that is, the concentration of the first electrolyte).

It is understood from the equations (12') and (13') that the larger the amounts $v_{12}$ and $v_{21}$ of the electrolytes transferred by the electrolyte exchanger 50 are, the smaller the difference in concentration $C_2-C_1$ between the first electrolyte and the second electrolyte in the steady state is. That is, the lower limits of the amounts $v_{12}$ and $v_{21}$ of the electrolytes transferred by the first and second electrolyte transferors 51 and 52 with respect to a desired upper limit of the difference in concentration $C_2-C_1$ can be calculated from the equations (12') and (13') respectively. As a simple example, assuming that $n_e=1$ mol/s, $\alpha=0.5$, $C_2=10$ mol/L, and $C_1=9.9$ mol/L: $v_{12}=5.9$ L/s: $v_{21}=5.891$ L/s, and $w_{s2}=9$ mL/s are calculated from the equations (12'), (13') and (7'), although $v_{12}$ and $v_{21}$ are not limited to the specific numeral values. Actually, the value of the OH⁻ permeability α is not determined only by the separating membrane, but also depends on the structure of the electrolysis vessel, the concentration and the supply of the electrolyte supplied to each chamber, and operation conditions such as a value of an electrolytic current in electrolysis, the temperature of the electrolyte, and the pressure difference between the chambers. The value of the OH⁻ permeability α necessary for calculation of the amounts $v_{12}$ and $v_{21}$ can be estimated by, for example, flowing the electrolyte through a real apparatus of the electrolysis vessel under the conditions same as the planned operation conditions except that the electrolyte exchanger 50 is not operated, and measuring the difference in the concentration of the electrolyte between the outlet side of the anode chamber 11 and the outlet side of the cathode chamber 12.

The value of $w_{s2}$ calculated from the equation (7') takes only water consumed by the electrolysis reaction into account. Actually, water also leaves the system as mist or water vapor in the gases recovered from the first and second gas recovery lines 60 and 70. In one embodiment, for example, the supply of the electrolyte pumped by the water supply pump 42 of the pure water supply system 40 may be a sum of $w_{s2}$ and the amount of such water leaving the system together with gas streams.

The supply $v_1$ of the electrolyte to the anode chamber 11 [L/s], and the supply $v_2$ of the electrolyte to the cathode chamber 12 [L/s] are represented as:

$$v_1 = v_{p1} + v_{21} \tag{14}$$

and $$v_2 = v_{p2} - v_{21} \tag{15},$$

respectively, using the amount $v_{p1}$ of the electrolyte pumped by the first circulation pump 22 [L/s], the amount $v_{p2}$ of the electrolyte pumped by the second circulation pump 32 [L/s], and the amount $v_{21}$ of the electrolyte transferred by the second electrolyte transferor 52 [L/s]. The supplies $v_1$ and $v_2$ of the electrolytes to the anode chamber 11 and the cathode chamber 12 are preferably almost equal to each other. Specifically, the amounts $v_{p1}$, $v_{p2}$ and $v_{21}$ of the electrolytes pumped by the first circulation pump 22, the second circulation pump 32, and the second electrolyte transferor 52 are preferably controlled so that the ratio $v_2/v_1$ is 0.80 to 1.20, and more preferably 0.90 to 1.10. The ratio $v_2/v_1$ within the foregoing range stabilizes the difference in the concentration of the electrolyte between the anode chamber 11 and the cathode chamber 12 after electrolysis, which makes it easy to stabilize the electrolysis voltage of the electrolysis vessel 10.

The ratios $v_{21}/v_{p1}$ and $v_{21}/v_{p2}$ of the amount $v_{21}$ of the electrolyte transferred by the second electrolyte transferor 52, to the amount $v_{p1}$ of the electrolyte pumped by the first circulation pump 22 and to the amount $v_{p2}$ of the electrolyte pumped by the second circulation pump 32 are each preferably no less than 0.001, and more preferably no less than 0.003; and in one embodiment, are each no more than 0.03, and preferably no more than 0.01. The ratios of the amount of the electrolyte transferred by the second electrolyte transferor 52, to the amount of the electrolyte pumped by the first circulation pump 22 and to the amount of the electrolyte pumped by the second circulation pump 32 each equal to or above the foregoing lower limit can further reduce the difference between the concentration of the electrolyte in the first electrolyte circulation system 20 and the concentration of the electrolyte in the second electrolyte circulation system 30, which makes it easy to keep the concentration of the electrolyte supplied to the anode chamber 11 and the concentration of the electrolyte supplied to the cathode chamber 12 within a range such that power efficiency is high. The ratios of the amount of the electrolyte transferred by the second electrolyte transferor 52, to the amount of the electrolyte pumped by the first circulation pump 22 and to the amount of the electrolyte pumped by the second circulation pump 32 each equal to or below the foregoing upper limit can reduce a remaining dissolved oxygen gas brought together with the electrolyte from the first electrolyte circulation system 20 to the second electrolyte circulation system 30, and a remaining dissolved hydrogen gas brought together with the electrolyte from the second electrolyte circulation system 30 to the first electrolyte circulation system 20, which can reduce hydrogen gas released from the liquid phase part 21a to the gas phase part 21b of the first circulation tank 21 to further improve the purity of oxygen gas recovered from the first gas recovery line 60, and can reduce oxygen gas released from the liquid phase part 31a to the gas phase part 31b of the second circulation tank 31 to further improve the purity of hydrogen gas recovered from the second gas recovery line 70.

The amount of the first electrolyte stored in the first circulation tank 21, to the total capacity of the first circulation tank 21 is preferably kept within the range of 1 and 99 vol %, and more preferably within the range of 30 and 70 vol %. Likewise, the amount of the second electrolyte stored in the second circulation tank 31, to the total capacity of the second circulation tank 31 is preferably kept within the range of 1 and 99 vol %, and more preferably within the range of 30 and 70 vol %. The amount of the electrolyte stored in each of the circulation tanks 21 and 31 within the foregoing range makes it possible to more stably operate the gas production apparatus 100.

Oxygen gas is recovered from the first gas recovery line 60. The first gas recovery line 60 comprises a first pressure regulator valve 61, a pipe 62 guiding the first gas stream flowing out of the anode chamber 11 from the gas phase part 21b of the first circulation tank 21 to the primary side (inlet side) of the first pressure regulator valve 61, and a manometer 63 disposed in the middle of the pipe 62 and monitoring the pressure of the first gas stream flowing in the pipe 62. The first pressure regulator valve 61 regulates the pressure of the first gas stream to a predetermined value. That is, the first pressure regulator valve 61 regulates the pressure of the gas in an area defined by the outlet of the anode chamber 11 and the primary side of the first pressure regulator valve 61, including the first circulation tank 21 to a predetermined value. As the first pressure regulator valve 61, any known regulator valve capable of regulating the pressure on the primary side to a predetermined value can be used without any limitations, and a solenoid valve or an air operated valve to maintain a predetermined value of the pressure on the primary side can be preferably used. The first pressure regulator valve 61, which is a solenoid valve or an air operated valve, does not let the gas flow out to the secondary side (outlet side) until the pressure on the primary side reaches a set value, and lets the gas flow out to the secondary side so that the pressure on the primary side is not beyond the set value if the gas is stored in the gas phase part 21b and the pressure on the primary side reaches the set value. The first gas recovery line 60 comprising the first pressure regulator valve 61 maintains a predetermined value of the pressure in the first electrolyte circulation system 20 comprising the anode chamber 11, the first circulation tank 21, and the first circulation pump 22.

Hydrogen gas is recovered from the second gas recovery line 70. The second gas recovery line 70 comprises a second pressure regulator valve 71, a pipe 72 guiding the second gas stream flowing out of the cathode chamber 12 from the gas phase part 31b of the second circulation tank 31 to the primary side (inlet side) of the second pressure regulator valve 71, and a manometer 73 disposed in the middle of the pipe 72 and monitoring the pressure of the second gas stream flowing in the pipe 72. The second pressure regulator valve 71 regulates the pressure of the second gas stream to a predetermined value. That is, the pressure regulator valve 71 regulates the pressure of the gas in an area defined by the outlet of the cathode chamber 12 and the primary side of the second pressure regulator valve 71, including the second circulation tank 31 to a predetermined value. As the second pressure regulator valve 71, any known regulator valve capable of regulating the pressure on the primary side to a predetermined value can be used without any limitations, and a solenoid valve or an air operated valve to maintain a predetermined value of the pressure on the primary side can be preferably used. The second pressure regulator valve 71, which is a solenoid valve or an air operated valve, does not let the gas flow out to the secondary side (outlet side) until the pressure on the primary side reaches a set value, and lets the gas flow out to the secondary side so that the pressure on the primary side is not beyond the set value if the gas is stored in the gas phase part 31b and the pressure on the primary side reaches the set value. The second gas recovery line 70 comprising the second pressure regulator valve 71 maintains a predetermined value of the pressure in the second electrolyte circulation system 30 comprising the cathode chamber 12, the second circulation tank 31, and the second circulation pump 32.

In one embodiment, either or both of the pressure inside the anode chamber 11 and the pressure inside the cathode chamber 12 is/are preferably maintained higher than an atmospheric pressure by no less than 20 kPa. For example, the pressure of the first gas stream on the upstream side (primary side) of the first pressure regulator valve 61, and the pressure of the second gas stream on the upstream side (primary side) of the second pressure regulator valve 71 can be maintained at, for example, 950 to 200 kPa, preferably 900 to 400 kPa. The maintained foregoing lower limits or above of the pressure of the first gas stream on the upstream side of the first pressure regulator valve 61, and of the pressure of the second gas stream on the upstream side of the second pressure regulator valve 71 generally cause the problem of a remaining dissolved gas to be easily revealed, and as a result, the effect of the present invention becomes significant. That is, the gas production apparatus and the gas production method according to the present invention are capable of preventing the gas composition in the gas phase parts of the circulation tanks from reaching flammability limits and are capable of producing both hydrogen gas and oxygen gas, while reducing a bad effect of a remaining dissolved gas in the electrolyte on gas purity, even in alkaline water electrolysis under such pressurized conditions. The pressure of the first gas stream on the upstream side of the first pressure regulator valve 61, and the pressure of the second gas stream on the upstream side of the second pressure regulator valve 71 at the foregoing upper limits or below make pressure regulation easy, and make it easy to select members to constitute the electrolysis vessel 10.

<2. Gas Production Method (1)>

The operation of the gas production apparatus 100, and a gas production method using the gas production apparatus 100 will be further described with reference to FIG. 1.

An electric current is applied between the anode housed in the anode chamber 11 and the cathode housed in the cathode chamber 12 of the electrolysis vessel 10 while the first electrolyte is supplied to the anode chamber 11 and the second electrolyte is supplied to the cathode chamber 12 respectively, to generate oxygen gas from the anode in the anode chamber 11 and hydrogen gas from the cathode in the cathode chamber 12 respectively (step (a)).

The first gas stream comprising the oxygen gas generated in the anode chamber 11, and the first electrolyte are recovered from the anode chamber 11 (step (b)). The first gas stream and the first electrolyte are recovered as a gas-liquid mixture from the anode chamber 11 via the pipe 23, introduced to the first circulation tank 21, and subjected to gas-liquid separation in the first circulation tank 21. The first electrolyte recovered from the anode chamber 11 to the first circulation tank 21 and subjected to gas-liquid separation is stored in the first circulation tank 21 (step (d)). The first electrolyte stored in the first circulation tank 21 is pumped to the anode chamber 11 by means of the first circulation pump 22 (step (f)).

The second gas stream comprising the hydrogen gas generated in the cathode chamber 12, and the second electrolyte are recovered from the cathode chamber 12 (step (c)). The second gas stream and the second electrolyte are recovered as a gas-liquid mixture from the cathode chamber 12 via the pipe 33, introduced to the second circulation tank 31, and subjected to gas-liquid separation in the second circulation tank 31. The second electrolyte recovered from the cathode chamber 12 to the second circulation tank 31 and subjected to gas-liquid separation is stored in the second circulation tank 31 (step (e)). The second electrolyte stored in the second circulation tank 31 is pumped to the cathode chamber 12 by means of the second circulation pump 32 (step (g)).

The first electrolyte stored in the first circulation tank 21 is partially transferred to the second circulation tank 31 by the first electrolyte transferor 51. This results in part of the first electrolyte introduced into the second electrolyte (step (h)). The second electrolyte pumped out by the second circulation pump 32 is branched by the second electrolyte transferor 52, and thus part thereof is joined to the first electrolyte pumped out by the first circulation pump 22. This results in the part of the second electrolyte introduced in the first electrolyte (step (i)).

The first gas stream recovered from the anode chamber 11 is taken out from the gas phase part 21b of the first circulation tank 21 via the first gas recovery line 60. The pressure of the first gas stream is regulated by means of the first pressure regulator valve 61 arranged in a flow path of the first gas stream (first gas recovery line 60) to a predetermine value (step (j)). The second gas stream recovered from the cathode chamber 12 is taken out from the gas phase part 31b of the second circulation tank 31 via the second gas recovery line 70. The pressure of the second gas stream is regulated by means of the second pressure regulator valve 71 arranged in a flow path of the second gas stream (second gas recovery line 70) to a predetermine value (step (k)).

The steps (a) to (k) are continuously carried out at the same time, which results in production of oxygen gas and hydrogen gas. The pure water supply system 40 replenishes water consumed by electrolysis.

In the gas production apparatus 100, the first electrolyte circulated through and supplied to the anode chamber 11, and the second electrolyte circulated through and supplied to the cathode chamber 12 are separately stored in the first circulation tank 21 and the second circulation tank 31 respectively. The first electrolyte and the second electrolyte are partially exchanged by the electrolyte exchanger 50, which relieves the imbalance in the amount and the concentration of the electrolyte between the anode side and the cathode side which is caused by electrolysis. The major constituent of the remaining dissolved gas in the first electrolyte is oxygen gas, and the major constituent of the remaining dissolved gas in the second electrolyte is hydrogen gas. The electrolyte exchanger 50 operates to bring part of the remaining dissolved oxygen gas in the first electrolyte into the second electrolyte, and to bring part of the remaining dissolved hydrogen gas in the second electrolyte into the first electrolyte. Since the first electrolyte and the second electrolyte are merely partially exchanged by the electrolyte exchanger 50, oxygen gas remains the major constituent of the remaining dissolved gas in the first electrolyte and hydrogen gas remains the major constituent of the remaining dissolved gas in the second electrolyte, even if operation of the gas production apparatus 100 continues. Thus, the influence of the operation of the electrolyte exchanger 50 on purity of the oxygen gas taken out of the first gas recovery line 60 and on purity of the hydrogen gas taken out of the second gas recovery line 70 is minor.

<3. Gas Production Apparatus (2)>

In the foregoing on the present invention, the gas production apparatus 100 comprising the electrolyte exchanger 50 that includes the first electrolyte transferor 51 transferring part of the first electrolyte stored in the first circulation tank 21 to the second circulation tank 31, and the second electrolyte transferor 52 transferring part of the second electrolyte flowing in the second pipe 35 connecting the outlet of the second circulation pump 32 and the inlet of the cathode chamber 12, to the first pipe 25 connecting the outlet of the first circulation pump 22 and the inlet of the anode chamber 11; and the gas production method using the gas production apparatus 100 have been described as examples. The present invention is not limited to these embodiments. For example, the gas production apparatus can comprise an electrolyte exchanger that includes a first electrolyte transferor transferring part of the second electrolyte stored in the second circulation tank 31 to the first circulation tank 21, and a second electrolyte transferor transferring part of the first electrolyte flowing in the first pipe 25 connecting the outlet of the first circulation pump 22 and the inlet of the anode chamber 11, to the second pipe 35 connecting the outlet of the second circulation pump 32 and the inlet of the cathode chamber 12; and the gas production method can use such a gas production apparatus.

Figure 2:
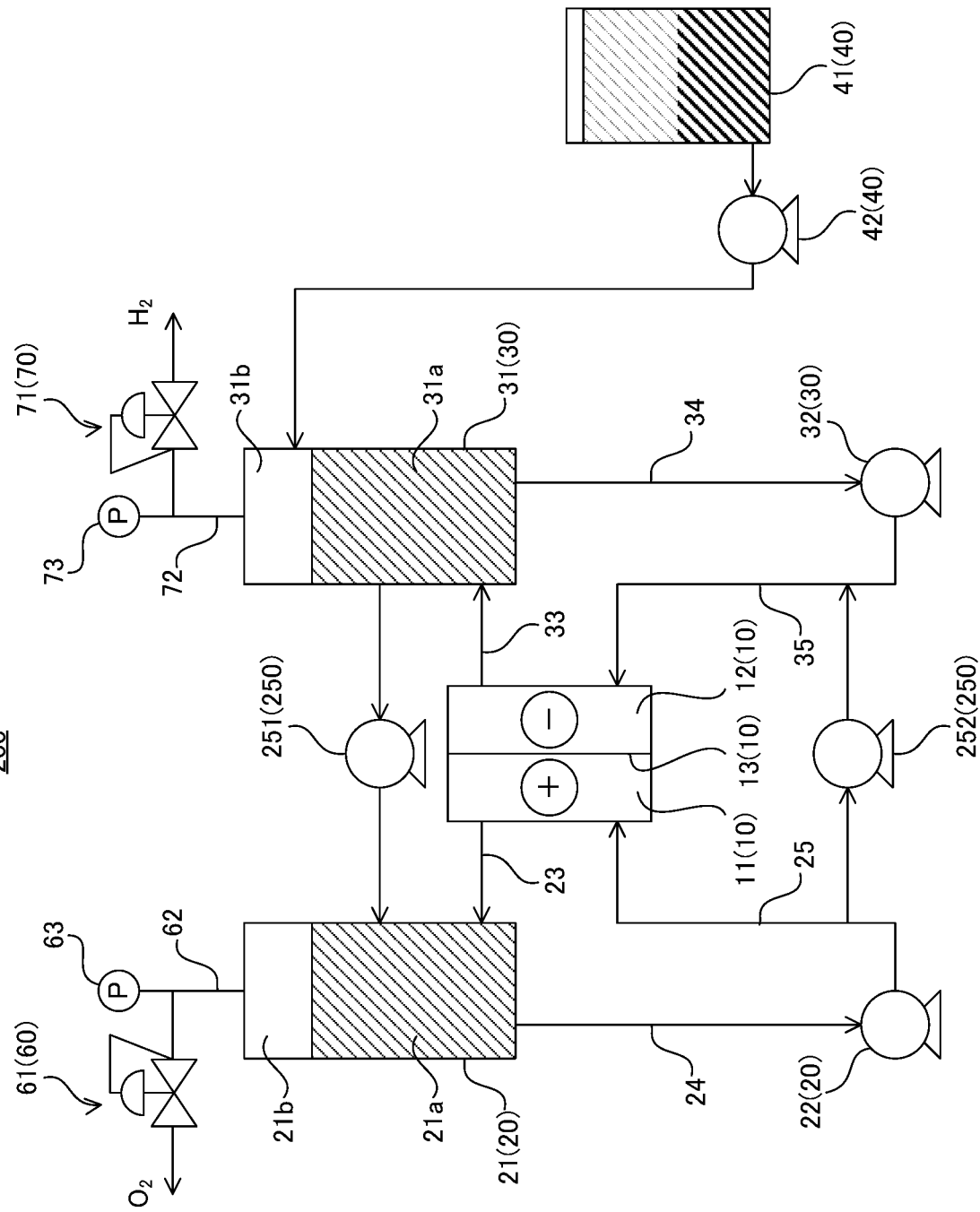
FIG. 2 is an explanatory schematic view of a gas production apparatus 200 according to another embodiment of the present invention.

FIG. 2 is an explanatory schematic view of a gas production apparatus 200 according to such another embodiment. In FIG. 2, the components already shown in FIG. 1 are given the same reference signs as in FIG. 1, and the description thereof may be omitted. The gas production apparatus 200 is different from the gas production apparatus 100 in that the gas production apparatus 200 comprises an electrolyte exchanger 250 instead of the electrolyte exchanger 50. The electrolyte exchanger 250 is different from the electrolyte exchanger 50 in that the electrolyte exchanger 250 comprises a first electrolyte transferor 251 instead of the first electrolyte transferor 51, and a second electrolyte transferor 252 instead of the second electrolyte transferor 52. The first electrolyte transferor 251 is different from the first electrolyte transferor 51 in that the first electrolyte transferor 251 transfers part of the second electrolyte stored in the second circulation tank 31 to the first circulation tank 21. The second electrolyte transferor 252 is different from the second electrolyte transferor 52 in that the second electrolyte transferor 252 transfers part of the first electrolyte flowing in the first pipe 25 connecting the outlet of the first circulation pump 22 and the inlet of the anode chamber 11, to the second pipe 35 connecting the outlet of the second circulation pump 32 and the inlet of the cathode chamber 12. In one embodiment, for example, any known pumps such as positive displacement pumps and non-positive displacement pumps can be used as the first electrolyte transferor 251 and the second electrolyte transferor 252. Examples of positive displacement pumps include plunger pumps, piston pumps, diaphragm pumps, and gear pumps. Examples of non-positive displacement pumps include centrifugal pumps and turbine pumps. The combination of a non-positive displacement pump with a controller controlling the flow rate is capable of feeding the electrolyte in a given direction at a given flow rate even when the non-positive displacement pump is used.

A condition under which the amount and the concentration of the electrolyte are in a steady state in the gas production apparatus 200 can be considered in the same manner as in the gas production apparatus 100, and is represented by the equations (3) to (6):

$$0 = dV_1/dt = -w_{c1} - v_{12} + v_{21} \quad (3);$$

$$0 = dV_2/dt = -w_{c2} + v_{12} - v_{21} + w_{s2} \quad (4);$$

$$0 = dN_1/dt = n_{f1} + n_{p21} - v_{12} \cdot C_1 + v_{21} \cdot C_2 \quad (5); \text{ and}$$

$$0 = dN_2/dt = n_{f2} - n_{p21} + v_{12} \cdot C_1 - v_{21} \cdot C_2 \quad (6).$$

In the gas production apparatus 200, $v_{12}$ means the same as the amount of the electrolyte transferred by the second electrolyte transferor 252, and $v_{21}$ means the same as the amount of the electrolyte transferred by the first electrolyte transferor 251. The equations (3) to (6) can be solved in the same way as the foregoing, and $$v_{12} = \{(1-\alpha)n_e + 0.009 n_e \cdot C_2\}/(C_2 - C_1) \quad (12'),$$

$$v_{21} = \{(1-\alpha)n_e + 0.009 n_e \cdot C_1\}/(C_2 - C_1) \quad (13'),$$

$$w_{s2} = 0.009 n_e \quad (7'), \text{ and}$$

$$v_{12} = v_{21} + 0.009 n_e \quad (8')$$

are obtained as the foregoing. That is, as well as the case in the gas production apparatus 100, in the steady state, the concentration $C_2$ of the electrolyte in the second electrolyte circulation system 30 (that is, the concentration of the second electrolyte) is kept higher than the concentration $C_1$ of the electrolyte in the first electrolyte circulation system 20 as a whole (that is, the concentration of the first electrolyte). The larger the amounts $v_{12}$ and $v_{21}$ of the electrolytes transferred from the electrolyte exchanger 250 are, the smaller the difference in concentration $C_2 - C_1$ between the first electrolyte and the second electrolyte in the steady state is.

In the gas production apparatus 200, the supply $v_1$ of the electrolyte to the anode chamber 11 [L/s], and the supply $v_2$ of the electrolyte to the cathode chamber 12 [L/s] are represented by $$v_1 = v_{p1} - v_{12} \quad (14'), \text{ and}$$

$$v_2 = v_{p2} + v_{12} \quad (15'),$$

respectively, using the amount $v_{p1}$ of the electrolyte pumped by the first circulation pump 22 [L/s], the amount $v_{p2}$ of the electrolyte pumped by the second circulation pump 32 [L/s], and the amount $v_{12}$ of the electrolyte transferred by the second electrolyte transferor 252 [L/s]. The supplies $v_1$ and $v_2$ of the electrolytes to the anode chamber 11 and the cathode chamber 12 are preferably almost equal to each other. Specifically, the amounts $v_{p1}$, $v_{p2}$ and $v_{12}$ of the electrolytes pumped by the first circulation pump 22, the second circulation pump 32, and the second electrolyte transferor 252 are preferably controlled so that the ratio $v_2/v_1$ is 0.80 to 1.20, and more preferably 0.90 to 1.10. The ratio $v_2/v_1$ within the foregoing range stabilizes the difference in the concentration of the electrolyte between the anode chamber 11 and the cathode chamber 12 after electrolysis, which makes it easy to stabilize the electrolysis voltage of the electrolysis vessel 10.

In the gas production apparatus 200, the ratios $v_{12}/v_{p1}$ and $v_{12}/v_{p2}$ of the amount $v_{12}$ of the electrolyte transferred by the second electrolyte transferor 252, to the amount $v_{p1}$ of the electrolyte pumped by the first circulation pump 22 and to the amount $v_{p2}$ of the electrolyte pumped by the second circulation pump 32 are each preferably no less than 0.001, and more preferably no less than 0.003; and in one embodiment, are each no more than 0.03, and preferably no more than 0.01. The ratios of the amount of the electrolyte transferred by the second electrolyte transferor 252, to the amount of the electrolyte pumped by the first circulation pump 22 and to the amount of the electrolyte pumped by the second circulation pump 32 each equal to or above the foregoing lower limit can further reduce the difference between the concentration of the electrolyte in the first electrolyte circulation system 20 and the concentration of the electrolyte in the second electrolyte circulation system 30, which makes it easy to keep the concentration of the electrolyte supplied to the anode chamber 11 and the concentration of the electrolyte supplied to the cathode chamber 12 within a range such that power efficiency is high. The ratios of the amount of the electrolyte transferred by the second electrolyte transferor 252, to the amount of the electrolyte pumped by the first circulation pump 22 and to the amount of the electrolyte pumped by the second circulation pump 32 each equal to or below the foregoing upper limit can reduce a remaining dissolved oxygen gas brought together with the electrolyte from the first electrolyte circulation system 20 to the second electrolyte circulation system 30, and a remaining dissolved hydrogen gas brought together with the electrolyte from the second electrolyte circulation system 30 to the first electrolyte circulation system 20, which can reduce hydrogen gas released from the liquid phase part 21a to the gas phase part 21b of the first circulation tank 21 to further improve the purity of oxygen gas recovered from the first gas recovery line 60, and can reduce oxygen gas released from the liquid phase part 31a to the gas phase part 31b of the second circulation tank 31 to further improve the purity of hydrogen gas recovered from the second gas recovery line 70.

The amount of the first electrolyte stored in the first circulation tank 21, to the total capacity of the first circulation tank 21 is preferably kept within the range of 1 and 99 vol %, and more preferably within the range of 30 and 70 vol %. Likewise, the amount of the second electrolyte stored in the second circulation tank 31, to the total capacity of the second circulation tank 31 is preferably kept within the range of 1 and 99 vol %, and more preferably within the range of 30 and 70 vol %. The amount of the electrolyte stored in each of the circulation tanks 21 and 31 within the foregoing range makes it possible to more stably operate the gas production apparatus 200.

<4. Gas Production Method (2)>

The operation of the gas production apparatus 200, and a gas production method using the gas production apparatus 200 will be further described with reference to FIG. 2.

An electric current is applied between the anode housed in the anode chamber 11 and the cathode housed in the cathode chamber 12 of the electrolysis vessel 10 while the first electrolyte is supplied to the anode chamber 11 and the second electrolyte is supplied to the cathode chamber 12 respectively, to generate oxygen gas from the anode in the anode chamber 11 and hydrogen gas from the cathode in the cathode chamber 12 respectively (step (a)).

The first gas stream comprising the oxygen gas generated in the anode chamber 11, and the first electrolyte are recovered from the anode chamber 11 (step (b)). The first gas stream and the first electrolyte are recovered as a gas-liquid mixture from the anode chamber 11 via the pipe 23, introduced to the first circulation tank 21, and subjected to gas-liquid separation in the first circulation tank 21. The first electrolyte recovered from the anode chamber 11 to the first circulation tank 21 and subjected to gas-liquid separation is stored in the first circulation tank 21 (step (d)). The first electrolyte stored in the first circulation tank 21 is pumped to the anode chamber 11 by means of the first circulation pump 22 (step (f)).

The second gas stream comprising the hydrogen gas generated in the cathode chamber 12, and the second electrolyte are recovered from the cathode chamber 12 (step (c)). The second gas stream and the second electrolyte are recovered as a gas-liquid mixture from the cathode chamber 12 via the pipe 33, introduced to the second circulation tank 31, and subjected to gas-liquid separation in the second circulation tank 31. The second electrolyte recovered from the cathode chamber 12 to the second circulation tank 31 and subjected to gas-liquid separation is stored in the second circulation tank 31 (step (e)). The second electrolyte stored in the second circulation tank 31 is pumped to the cathode chamber 12 by means of the second circulation pump 32 (step (g)).

The second electrolyte stored in the second circulation tank 31 is partially transferred to the first circulation tank 21 by the first electrolyte transferor 251. This results in part of the second electrolyte introduced into the first electrolyte (step (h)). The first electrolyte pumped out by the first circulation pump 22 is branched by the second electrolyte transferor 252, and thus part thereof is joined to the second electrolyte pumped out by the second circulation pump 32. This results in the part of the second electrolyte introduced in the first electrolyte (step (i)).

The first gas stream recovered from the anode chamber 11 is taken out from the gas phase part 21b of the first circulation tank 21 via the first gas recovery line 60. The pressure of the first gas stream is regulated by means of the first pressure regulator valve 61 arranged in the flow path of the first gas stream (first gas recovery line 60) to a predetermine value (step (j)). The second gas stream recovered from the cathode chamber 12 is taken out from the gas phase part 31b of the second circulation tank 31 via the second gas recovery line 70. The pressure of the second gas stream is regulated by means of the second pressure regulator valve 71 arranged in the flow path of the second gas stream (second gas recovery line 70) to a predetermine value (step (k)).

The steps (a) to (k) are continuously carried out at the same time, which results in production of oxygen gas and hydrogen gas. The pure water supply system 40 replenishes water consumed by electrolysis. The same effect as the foregoing can be also obtained by the gas production apparatus 200 and the gas production method using the gas production apparatus 200.

<5. Gas Production Apparatus (3)>

In the foregoing on the present invention, the gas production apparatuses 100 and 200 each comprising the pure water supply system 40 supplying water to the second circulation tank 31, and the gas production methods using the gas production apparatuses 100 and 200 have been described as examples. The present invention is not limited to these embodiments. For example, the gas production apparatus can comprise a pure water supply system supplying water to the first circulation tank 21, and the gas production method can use such a gas production apparatus.

Figure 3:
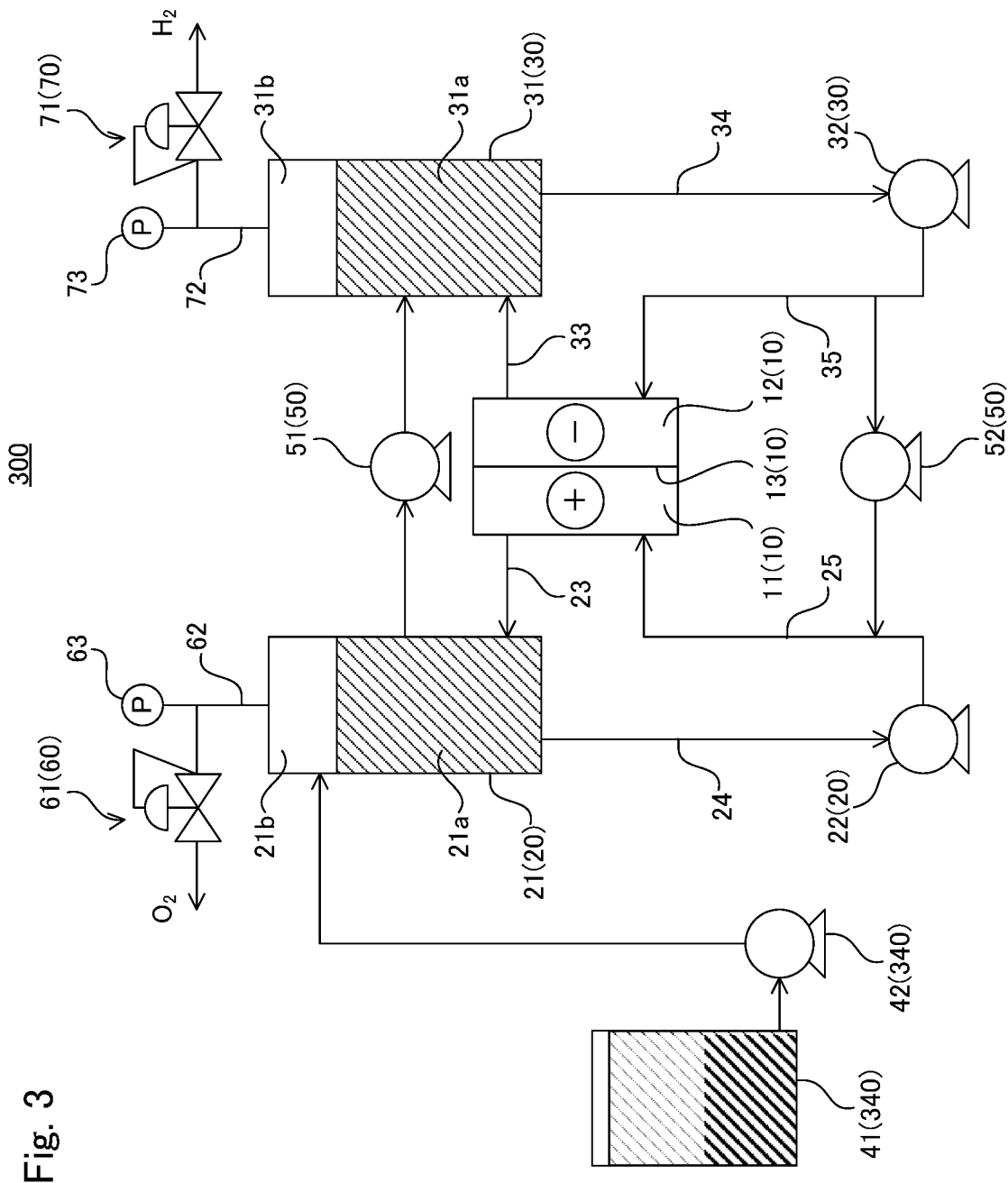
FIG. 3 is an explanatory schematic view of a gas production apparatus 300 according to another embodiment of the present invention.

FIG. 3 is an explanatory schematic view of a gas production apparatus 300 according to such another embodiment. In FIG. 3, the components already shown in FIGS. 1 and 2 are given the same reference signs as in FIGS. 1 and 2, and the description thereof may be omitted. The gas production apparatus 300 is different from the gas production apparatus 100 in that the gas production apparatus 300 comprises a pure water supply system 340 instead of the pure water supply system 40. The pure water supply system 340 comprises the pure water tank 41 and the water supply pump 42, in common with the pure water supply system 40. The pure water supply system 340 is different from the pure water supply system 40 in that the water supply pump 42 supplies water stored in the pure water tank 41 to the first circulation tank 21.

A condition under which the amount and the concentration of the electrolyte in the gas production apparatus 300 are in a steady state is represented by the equations (18), (19), (5) and (6):

$$0 = dV_1/dt = -w_{c1} - v_{12} + v_{21} + w_{s1} \quad (18);$$

$$0 = dV_2/dt = -w_{c2} + v_{12} - v_{21} \quad (19);$$

$$0 = dN_1/dt = n_{f1} + n_{p21} - v_{12} \cdot C_1 + v_{21} \cdot C_2 \quad (5); \text{ and}$$

$$0 = dN_2/dt = n_{f2} - n_{p21} + v_{12} \cdot C_1 - v_{21} \cdot C_2 \quad (6)$$

(in the equations (18) and (19), $w_{s1}$ represents a water supply by the pure water supply system 40 to the first circulation tank 21 per unit time [L/s].

In the gas production apparatus 300, $v_{12}$ means the same as the amount of the electrolyte transferred by the first electrolyte transferor 51, and $v_{21}$ means the same as the amount of the electrolyte transferred by the second electrolyte transferor 52. The equations (18), (19), (5) and (6) are solved. From the equations (18)+(19), $$w_{s1} = w_{c1} + w_{c2} \quad (20).$$

From the equations (2)−(1), $$w_{c1} - w_{c2} + 2(v_{12} - v_{21}) - w_{s1} = 0.$$

Further, the equation (20) is substituted, and then $$v_{12} - v_{21} = w_{c2} \quad (21)$$

is obtained.

From the equations (5) and (6), in the same manner as the foregoing, $$n_{f1} + n_{f2} = 0 \quad (9), \text{ and}$$

$$n_{f2} - n_{p21} + v_{12} \cdot C_1 - v_{21} \cdot C_2 = 0 \quad (10)$$

are obtained. In the same manner as the foregoing, using the OH$^-$ permeability α (0<α<1), $n_{p21}$ can be represented as:

$$n_{p21} = \alpha \cdot n_{f2} \quad (11)$$

From the equation (10), $$(1-\alpha)n_{f2} + v_{12} \cdot C_1 - v_{21} \cdot C_2 = 0 \quad (10').$$

From the equations (10') and (21), $$v_{12} = \{(1-\alpha)n_{f2} + w_{c2} \cdot C_2\}/(C_2 - C_1) \quad (22), \text{ and}$$

$$v_{21} = \{(1-\alpha)n_{f2} + w_{c2} \cdot C_1\}/(C_2 - C_1) \quad (23)$$

are obtained. In the same manner as the foregoing, $n_{f2}$, $w_{c1}$, and $w_{c2}$ can be represented as:

$$n_{f2} = n_e \quad (14),$$

$$w_{c1} = (18/1000) \times (-\tfrac{1}{2}) n_e = -0.009 n_e \quad (15), \text{ and}$$

$$w_{c2} = (18/1000) \times n_e = 0.018 n_e \quad (16)$$

By substituting the equations (14) to (16) into the equations (20) to (23), $$v_{12} = \{(1-\alpha)n_e + 0.018 n_e \cdot C_2\}/(C_2 - C_1) \quad (22'),$$

$$v_{21} = \{(1-\alpha)n_e + 0.018 n_e \cdot C_1\}/(C_2 - C_1) \quad (23'),$$

$$w_{s1} = 0.009 n_e \quad (20'), \text{ and}$$

$$v_{12} = v_{21} + 0.018 n_e \quad (21')$$

are obtained. That is, as well as the case in the gas production apparatus 100, in the steady state, the concentration $C_2$ of the electrolyte in the second electrolyte circulation system 30 (that is, the concentration of the second electrolyte) is kept higher than the concentration $C_1$ of the electrolyte in the first electrolyte circulation system 20 as a whole (that is, the concentration of the first electrolyte). The larger the amounts $v_{12}$ and $v_{21}$ of the electrolytes transferred from the electrolyte exchanger 50 are, the smaller the difference in concentration $C_2 - C_1$ between the first electrolyte and the second electrolyte in the steady state is.

In the gas production apparatus 300, the supply $v_1$ of the electrolyte to the anode chamber 11 [L/s], and the supply $v_2$ of the electrolyte to the cathode chamber 12 [L/s] are represented by $$v_1 = v_{p1} + v_{21} \quad (14), \text{ and}$$

$$v_2 = v_{p2} - v_{21} \quad (15),$$

respectively, using the amount $v_{p1}$ of the electrolyte pumped by the first circulation pump 22 [L/s], the amount $v_{p2}$ of the electrolyte pumped by the second circulation pump 32 [L/s], and the amount $v_{21}$ of the electrolyte transferred by the second electrolyte transferor 52 [L/s]. The supplies $v_1$ and $v_2$ of the electrolytes to the anode chamber 11 and the cathode chamber 12 are preferably almost equal to each other. Specifically, the amounts $v_{p1}$, $v_{p2}$ and $v_{21}$ of the electrolytes pumped by the first circulation pump 22, the second circulation pump 32, and the second electrolyte transferor 52 are preferably controlled so that the ratio $v_2/v_1$ is 0.80 to 1.20, and more preferably 0.90 to 1.10. The ratio $v_2/v_1$ within the foregoing range stabilizes the difference in the concentration of the electrolyte between the anode chamber 11 and the cathode chamber 12 after electrolysis, which makes it easy to stabilize the electrolysis voltage of the electrolysis vessel 10.

In the gas production apparatus 300, the ratios $v_{21}/v_{p1}$ and $v_{21}/v_{p2}$ of the amount $v_{21}$ of the electrolyte transferred by the second electrolyte transferor 52, to the amount $v_{p1}$ of the electrolyte pumped by the first circulation pump 22 and to the amount $v_{p2}$ of the electrolyte pumped by the second circulation pump 32 are each preferably no less than 0.001, and more preferably no less than 0.003; and in one embodiment, are each no more than 0.03, and preferably no more than 0.01. The ratios of the amount of the electrolyte transferred by the second electrolyte transferor 52, to the amount of the electrolyte pumped by the first circulation pump 22 and to the amount of the electrolyte pumped by the second circulation pump 32 each equal to or above the foregoing lower limit can further reduce the difference between the concentration of the electrolyte in the first electrolyte circulation system 20 and the concentration of the electrolyte in the second electrolyte circulation system 30, which makes it easy to keep the concentration of the electrolyte supplied to the anode chamber 11 and the concentration of the electrolyte supplied to the cathode chamber 12 within a range such that power efficiency is high. The ratios of the amount of the electrolyte transferred by the second electrolyte transferor 52, to the amount of the electrolyte pumped by the first circulation pump 22 and to the amount of the electrolyte pumped by the second circulation pump 32 each equal to or below the foregoing upper limit can reduce a remaining dissolved oxygen gas brought together with the electrolyte from the first electrolyte circulation system 20 to the second electrolyte circulation system 30, and a remaining dissolved hydrogen gas brought together with the electrolyte from the second electrolyte circulation system 30 to the first electrolyte circulation system 20, which can reduce hydrogen gas released from the liquid phase part 21a to the gas phase part 21b of the first circulation tank 21 to further improve the purity of oxygen gas recovered from the first gas recovery line 60, and can reduce oxygen gas released from the liquid phase part 31a to the gas phase part 31b of the second circulation tank 31 to further improve the purity of hydrogen gas recovered from the second gas recovery line 70.

The amount of the first electrolyte stored in the first circulation tank 21, to the total capacity of the first circulation tank 21 is preferably kept within the range of 1 and 99 vol %, and more preferably within the range of 30 and 70 vol %. Likewise, the amount of the second electrolyte stored in the second circulation tank 31, to the total capacity of the second circulation tank 31 is preferably kept within the range of 1 and 99 vol %, and more preferably within the range of 30 and 70 vol %. The amount of the electrolyte stored in each of the circulation tanks 21 and 31 within the foregoing range makes it possible to more stably operate the gas production apparatus 300.

<6. Gas Production Method (3)>

The operation of the gas production apparatus 300, and a gas production method using the gas production apparatus 300 are the same as in the foregoing description on the gas production apparatus 100 except that the pure water supply system 40 supplies water not to the second circulation tank 31 but to the first circulation tank 21. The same effect as the foregoing can be also obtained by the gas production apparatus 300 and the gas production method using the gas production apparatus 300.

<7. Gas Production Apparatus (4)>

Figure 4:
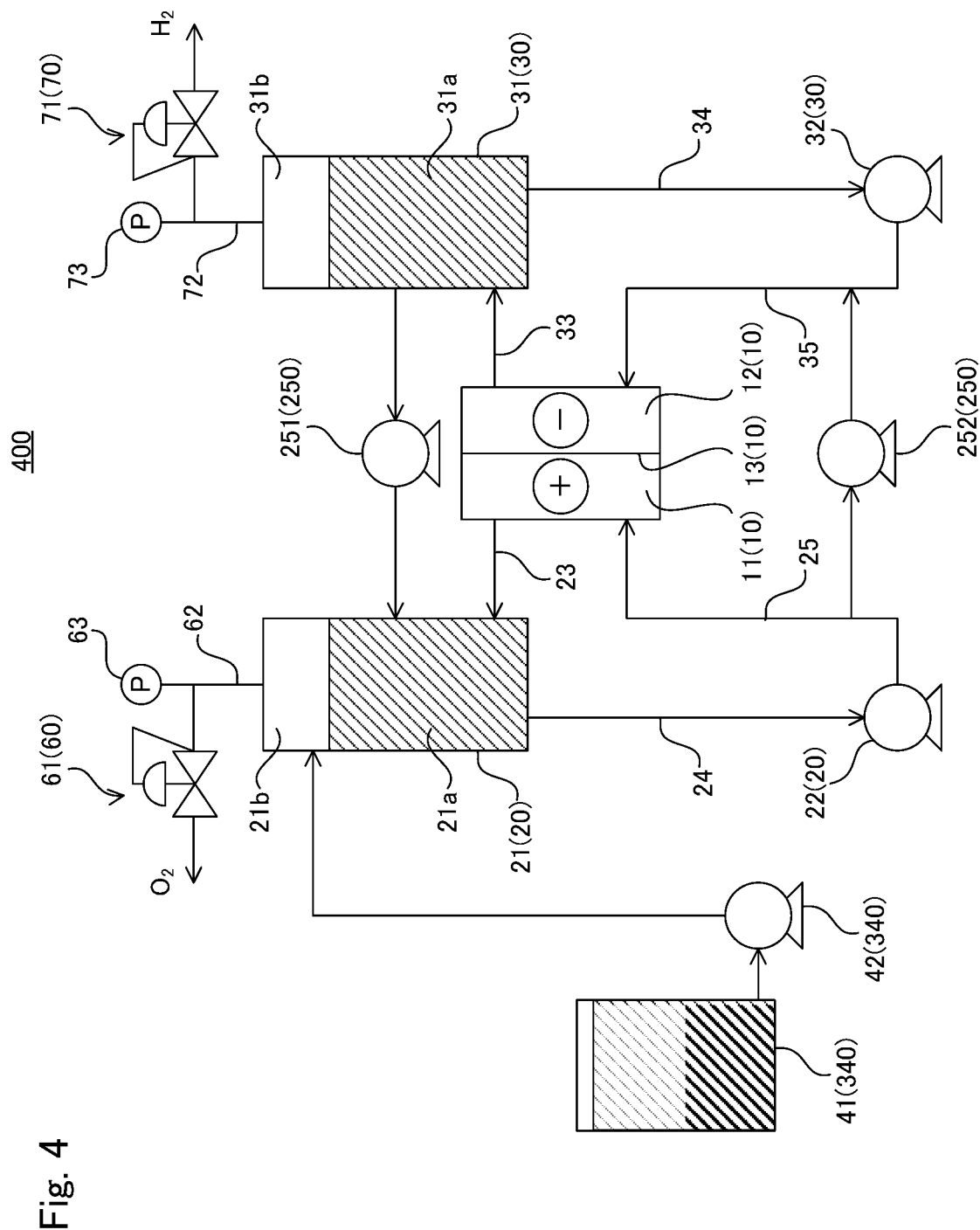
FIG. 4 is an explanatory schematic view of a gas production apparatus 400 according to another embodiment of the present invention.

FIG. 4 is an explanatory schematic view of a gas production apparatus 400 according to another embodiment. In FIG. 4, the components already shown in FIGS. 1 to 3 are given the same reference signs as in FIGS. 1 to 3, and the description thereof may be omitted. The gas production apparatus 400 comprises the electrolyte exchanger 250 (see FIG. 2) instead of the electrolyte exchanger 50, and thus is different from the gas production apparatus 300.

A condition under which the amount and the concentration of the electrolyte are in a steady state in the gas production apparatus 400 can be considered in the same manner as in the gas production apparatus 300, and is represented by the equations (18), (19), (5) and (6):

$$0 = dV_1/dt = -w_{c1} - v_{12} + v_{21} + w_{s1} \quad (18);$$

$$0 = dV_2/dt = -w_{c2} + v_{12} - v_{21} \quad (19);$$

$$0 = dN_1/dt = n_{p1} + n_{p21} - v_{12} \cdot C_1 + v_{21} \cdot C_2 \quad (5); \text{ and}$$

$$0 = dN_2/dt = n_{p2} - n_{p21} + v_{12} \cdot C_1 + v_{21} \cdot C_2 \quad (6)$$

In the gas production apparatus 400, $v_{12}$ means the same as the amount of the electrolyte transferred by the second electrolyte transferor 252, and $v_{21}$ means the same as the amount of the electrolyte transferred by the first electrolyte transferor 251. The equations (18), (19), (5) and (6) can be solved in the same way as the foregoing, and then $$v_{12} = \{(1-\alpha)n_e + 0.018 n_e \cdot C_2\}/(C_2 - C_1) \quad (22'),$$

$$v_{21} = \{(1-\alpha)n_e + 0.018 n_e \cdot C_1\}/(C_2 - C_1) \quad (23'),$$

$$w_{s1} = 0.009 n_e \quad (20'), \text{ and}$$

$$v_{12} = v_{21} + 0.018 n_e \quad (21')$$

are obtained. That is, as well as the case in the gas production apparatus 300, in the steady state, the concentration $C_2$ of the electrolyte in the second electrolyte circulation system 30 (that is, the concentration of the second electrolyte) is kept higher than the concentration $C_1$ of the electrolyte in the first electrolyte circulation system 20 as a whole (that is, the concentration of the first electrolyte). The larger the amounts $v_{12}$ and $v_{21}$ of the electrolytes transferred from the electrolyte exchanger 250 are, the smaller the difference in concentration $C_2-C_1$ between the first electrolyte and the second electrolyte in the steady state is.

In the gas production apparatus 400, the supply $v_1$ of the electrolyte to the anode chamber 11 [L/s], and the supply $v_2$ of the electrolyte to the cathode chamber 12 [L/s] are represented by $$v_1 = v_{p1} - v_{12} \quad (14'), \text{ and}$$

$$v_2 = v_{p2} + v_{12} \quad (15'),$$

respectively, using the amount $v_{p1}$ of the electrolyte pumped by the first circulation pump 22 [L/s], the amount $v_{p2}$ of the electrolyte pumped by the second circulation pump 32 [L/s], and the amount $v_{12}$ of the electrolyte transferred by the second electrolyte transferor 252 [L/s]. The supplies $v_1$ and $v_2$ of the electrolytes to the anode chamber 11 and the cathode chamber 12 are preferably almost equal to each other. Specifically, the amounts $v_{p1}$, $v_{p2}$ and $v_{12}$ of the electrolytes pumped by the first circulation pump 22, the second circulation pump 32, and the second electrolyte transferor 252 are preferably controlled so that the ratio $v_2/v_1$ is 0.80 to 1.20, and more preferably 0.90 to 1.10. The ratio $v_2/v_1$ within the foregoing range stabilizes the difference in the concentration of the electrolyte between the anode chamber 11 and the cathode chamber 12 after electrolysis, which makes it easy to stabilize the electrolysis voltage of the electrolysis vessel 10.

In the gas production apparatus 400, the ratios $v_1/v_{p1}$ and $v_{12}/v_{p2}$ of the amount vu of the electrolyte transferred by the second electrolyte transferor 252, to the amount $v_{p1}$ of the electrolyte pumped by the first circulation pump 22 and to the amount $v_{p2}$ of the electrolyte pumped by the second circulation pump 32 are each preferably no less than 0.001, and more preferably no less than 0.003; and in one embodiment, are each no more than 0.03, and preferably no more than 0.01. The ratios of the amount of the electrolyte transferred by the second electrolyte transferor 252, to the amount of the electrolyte pumped by the first circulation pump 22 and to the amount of the electrolyte pumped by the second circulation pump 32 each equal to or above the foregoing lower limit can further reduce the difference between the concentration of the electrolyte in the first electrolyte circulation system 20 and the concentration of the electrolyte in the second electrolyte circulation system 30, which makes it easy to keep the concentration of the electrolyte supplied to the anode chamber 11 and the concentration of the electrolyte supplied to the cathode chamber 12 within a range such that power efficiency is high. The ratios of the amount of the electrolyte transferred by the second electrolyte transferor 252, to the amount of the electrolyte pumped by the first circulation pump 22 and to the amount of the electrolyte pumped by the second circulation pump 32 each equal to or below the foregoing upper limit can reduce a remaining dissolved oxygen gas brought together with the electrolyte from the first electrolyte circulation system 20 to the second electrolyte circulation system 30, and a remaining dissolved hydrogen gas brought together with the electrolyte from the second electrolyte circulation system 30 to the first electrolyte circulation system 20, which can reduce hydrogen gas released from the liquid phase part 21*a* to the gas phase part 21*b* of the first circulation tank 21 to further improve the purity of oxygen gas recovered from the first gas recovery line 60, and can reduce oxygen gas released from the liquid phase part 31*a* to the gas phase part 31*b* of the second circulation tank 31 to further improve the purity of hydrogen gas recovered from the second gas recovery line 70.

The amount of the first electrolyte stored in the first circulation tank 21, to the total capacity of the first circulation tank 21 is preferably kept within the range of 1 and 99 vol %, and more preferably within the range of 30 and 70 vol %. Likewise, the amount of the second electrolyte stored in the second circulation tank 31, to the total capacity of the second circulation tank 31 is preferably kept within the range of 1 and 99 vol %, and more preferably within the range of 30 and 70 vol %. The amount of the electrolyte stored in each of the circulation tanks 21 and 31 within the foregoing range makes it possible to more stably operate the gas production apparatus 400.

<8. Gas Production Method (4)>

The operation of the gas production apparatus 400, and a gas production method using the gas production apparatus 400 are the same as in the foregoing description on the gas production apparatus 200 except that the pure water supply system 40 supplies water not to the second circulation tank 31 but to the first circulation tank 21. The same effect as the foregoing can be also obtained by the gas production apparatus 400 and the gas production method using the gas production apparatus 400.

<9. Gas Production Apparatus (5)>

Figure 5:
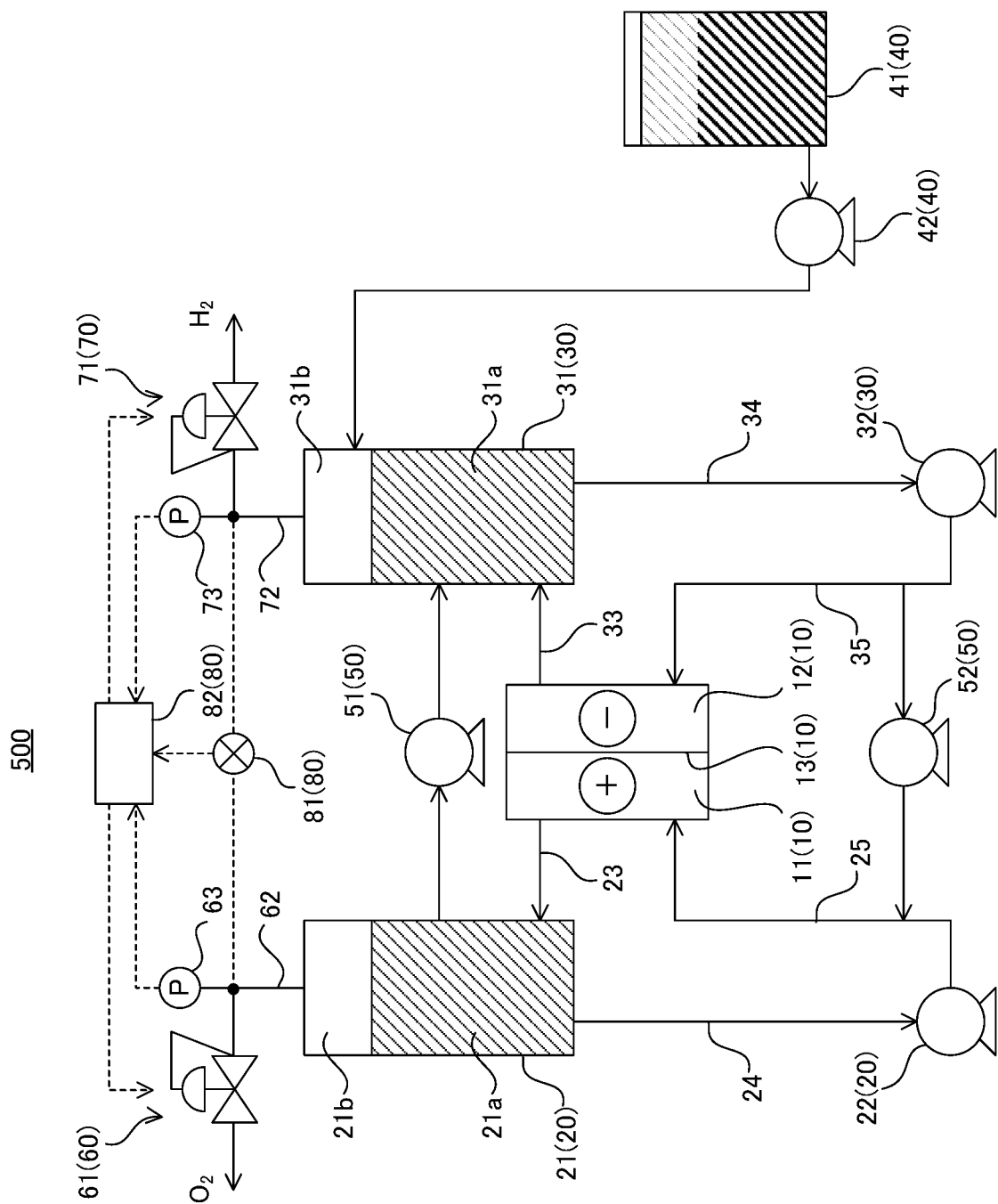
FIG. 5 is an explanatory schematic view of a gas production apparatus 500 according to another embodiment of the present invention.

FIG. 5 is an explanatory schematic view of a gas production apparatus 500 according to another embodiment. In FIG. 5, the components already shown in FIGS. 1 to 4 are given the same reference signs as in FIGS. 1 to 4, and the description thereof may be omitted. The gas production apparatus 500 is different from the gas production apparatus 100 (see FIG. 1) in that the gas production apparatus 500 further comprises a differential pressure regulator 80 regulating the pressure difference between the pressure of the first gas stream on the upstream side of the first pressure regulator valve 61 and the pressure of the second gas stream on the upstream side of the second pressure regulator valve 71. In FIG. 5, the dashed arrows indicate directions where data flows.

The differential pressure regulator 80 comprises a differential pressure detector 81 and a valve controller 82. The differential pressure detector 81 measures the pressure difference between the pressure of the first gas stream on the upstream side of the first pressure regulator valve 61 and the pressure of the second gas stream on the upstream side of the second pressure regulator valve 71. Any known differential pressure sensor can be used as the differential pressure detector 81. The result of the measurement by the differential pressure detector 81 is inputted to the valve controller 82. The valve controller 82 receives at least a detection signal from the differential pressure detector 81, to transmit a signal controlling the opening degree(s) of the valve(s) to the first pressure regulator valve 61 and/or the second pressure regulator valve 71. In one embodiment, the valve controller 82 controls the opening degree(s) of the first pressure regulator valve 61 and/or the second pressure regulator valve 71 based on the result of the measurement by the differential pressure detector 81 so that a predetermined upper value or below of the foregoing pressure difference is kept. The differential pressure regulator 80 may fix the opening degree of the first pressure regulator valve 61 and adjust the opening degree of the second pressure regulator valve 71 to control the pressure difference, or may fix the opening degree of the second pressure regulator valve 71 and adjust the opening degree of the first pressure regulator valve 61 to control the pressure difference, or may adjust both the opening degrees of the first pressure regulator valve 61 and the second pressure regulator valve 71 to control the pressure difference.

The valve controller 82 may further receive (a) detection signal(s) from the manometer 63 and/or the manometer 73 in addition to the detection signal from the differential pressure detector 81. In one embodiment, the valve controller 82 may control the first pressure regulator valve 61 and/or the second pressure regulator valve 71 based on the result of the measurement by the manometer 63 and/or the result of the measurement by the manometer 73 in addition to the result of the measurement by the differential pressure detector 81, and may control the opening degree(s) of the first pressure regulator valve 61 and/or the second pressure regulator valve 71 so that the pressure of the first gas stream on the upstream side of the first pressure regulator valve 61 and the pressure of the second gas stream on the upstream side of the second pressure regulator valve 71 are kept within a predetermined range and so that a predetermined upper value or below of the foregoing pressure difference is maintained.

For example, conventional feedback control etc. can be employed for the control of the first pressure regulator valve 61 and/or the second pressure regulator valve 71 by the valve controller 82 without any particular limitations. A conventional controller capable of such feedback control (such as a computer equipped with a microprocessor and a memory, and a programmable logic controller (PLC)) can be used as the valve controller 82 without any particular limitations.

The gas production apparatus 500 comprising the differential pressure regulator 80 can further reduce the difference in liquid level between the first circulation tank 21 and the second circulation tank 31, and can suppress deterioration of the gas purity due to gas forced from one into the other chamber passing through the separating membrane in the electrolysis vessel 10 by the pressure difference. In view of further improving the effect of comprising the differential pressure regulator 80, the differential pressure controller 80 preferably controls the pressure difference between the pressure of the first gas stream on the upstream side of the first pressure regulator valve 61 and the pressure of the second gas stream on the upstream side of the second pressure regulator valve 71 to 10 kPa or below, more preferably 1 kPa or below.

<10. Gas Production Method (5)>

The operation of the gas production apparatus 500, and a gas production method using the gas production apparatus 500 are the same as in the foregoing description on the gas production apparatus 100 except the matter concerning the differential pressure regulator 80. In the gas production apparatus 500, further, the pressure difference between the pressure of the first gas stream on the upstream side of the first pressure regulator valve 61 and the pressure of the second gas stream on the upstream side of the second pressure regulator valve 71 is regulated by the differential pressure regulator 80 to be a predetermined value (step (p)). Specifically, the pressure difference between the pressure of the first gas stream on the upstream side of the first pressure regulator valve 61 and the pressure of the second gas stream on the upstream side of the second pressure regulator valve 71 is measured by the differential pressure regulator 81 (step (p1)), and the first pressure regulator valve 61 and/or the second pressure regulator valve 71 is/are controlled in the steps (j) and (k) based on the result of the measurement in the step (p1) (step (p2)). The step (p) is continuously carried out at the same time as the foregoing steps (a) to (k). The gas production method according to such an embodiment is capable of further reducing the difference in liquid level between the first circulation tank 21 and the second circulation tank 31, and is capable of suppressing deterioration of the gas purity due to gas forced from one into the other chamber passing through the separating membrane in the electrolysis vessel 10 by the pressure difference, in addition to bringing about the effect explained in the foregoing concerning the gas production method using the gas production apparatus 100.

<11. Gas Production Apparatus (6)>

Figure 6:
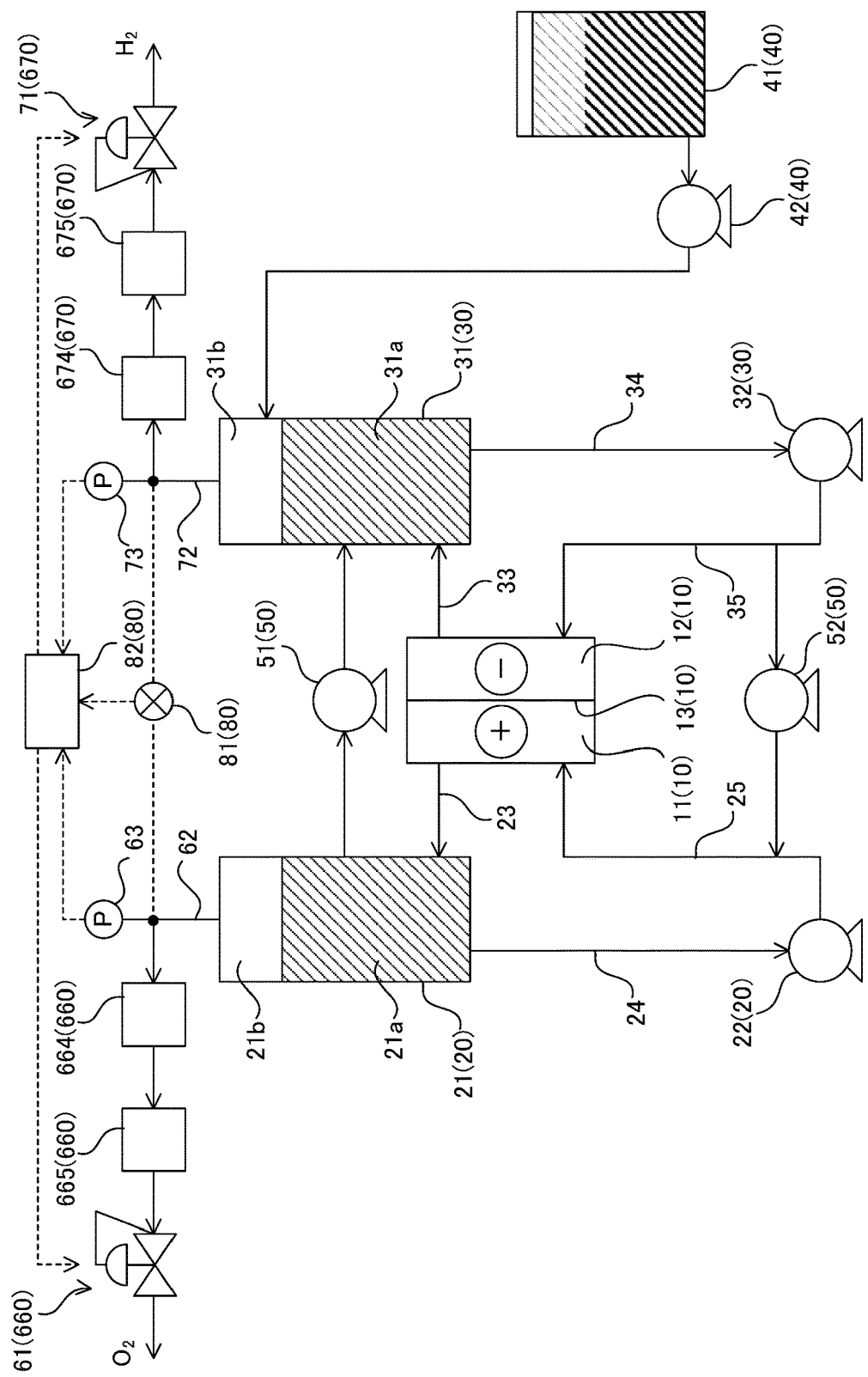
FIG. 6 is an explanatory schematic view of a gas production apparatus 600 according to another embodiment of the present invention.

FIG. 6 is an explanatory schematic view of a gas production apparatus 600 according to another embodiment. In FIG. 6, the components already shown in FIGS. 1 to 5 are given the same reference signs as in FIGS. 1 to 5, and the description thereof may be omitted. The gas production apparatus 600 is different from the gas production apparatus 500 (see FIG. 5) in that the gas production apparatus 600 comprises a first gas recovery line 660 instead of the first gas recovery line 60, and a second gas recovery line 670 instead of the second gas recovery line 70.

The first gas recovery line 660 is different from the first gas recovery line 60 in that the first gas recovery line 660 further comprises a first cooler 664 and a first filter 665. The first cooler 664 and the first filter 665 are arranged on the upstream side of the first pressure regulator valve 61. The first cooler 664 receives and cools the first gas stream flowing out from the gas phase part 21b of the first circulation tank 21. The first filter 665 is arranged on the downstream side of the first cooler 664, receives the first gas stream cooled by the first cooler 664, and removes a liquefied moisture in the first gas stream. The first gas stream passes through the first cooler 664 and the first filter 665, which results in removal of electrolyte mist and water vapor from the first gas stream. Any gas cooler and filter that are conventionally used for gas purification can be used as the first cooler 664 and the first filter 665. Drain water generated in the first cooler 664 and the first filter 665 may be discharged, or may be returned to the electrolyte. The first cooler 664 and the first filter 665 are arranged on the upstream side of the first pressure regulator valve 61, which makes it difficult for electrolyte mist and water vapor contained in the first gas stream to influence the first pressure regulator valve 61.

The second gas recovery line 670 is different from the second gas recovery line 70 in that the second gas recovery line 670 further comprises a second cooler 674 and a second filter 675. The second cooler 674 and the second filter 675 are arranged on the upstream side of the second pressure regulator valve 71. The second cooler 674 receives and cools the second gas stream flowing out from the gas phase part 31b of the second circulation tank 31. The second filter 675 is arranged on the downstream side of the second cooler 674, receives the second gas stream cooled by the second cooler 674, and removes a liquefied moisture in the second gas stream. The second gas stream passes through the second cooler 674 and the second filter 675, which results in removal of electrolyte mist and water vapor from the second gas stream. Any gas cooler and filter that are conventionally used for gas purification can be used as the second cooler 674 and the second filter 675. Drain water generated in the second cooler 674 and the second filter 675 may be discharged, or may be returned to the electrolyte. The second cooler 674 and the second filter 675 are arranged on the upstream side of the second pressure regulator valve 71, which makes it difficult for electrolyte mist and water vapor contained in the second gas stream to influence the second pressure regulator valve 71.

The gas production apparatus 600 comprising the first cooler 664 and the first filter 665, and the second cooler 674 and the second filter 675 is capable of producing oxygen gas and hydrogen gas having further improved purity. A hydrogen gas removal apparatus to remove hydrogen gas from the first gas stream may be further disposed on the downstream side of the first cooler 664 and the first filter 665, or on the downstream side of the first pressure regulator valve 61, and an oxygen gas removal apparatus to remove oxygen gas from the second gas stream may be further disposed on the downstream side of the second cooler 674 and the second filter 675, or on the downstream side of the second pressure regulator valve 71.

<12. Gas Production Method (6)>

The operation of the gas production apparatus 600, and a gas production method using the gas production apparatus 600 are the same as in the foregoing description on the gas production method using the gas production apparatus 500 except the matters concerning the first cooler 664 and the first filter 665, and the second cooler 674 and the second filter 675.

The first gas stream recovered from the anode chamber 11 and flowing out from the gas phase part 21b of the first circulation tank 21 is cooled in the first cooler 664 (step (l)). In the first filter 665, a moisture condensed in the step (l) is removed from the first gas stream after the step (l) (step (n)). The pressure of the first gas stream after the steps (l) and (n) is regulated by means of the first pressure regulator valve 61 (step (j)).

The second gas stream recovered from the cathode chamber 12 and flowing out from the gas phase part 31b of the second circulation tank 31 is cooled in the second cooler 674 (step (m)). In the second filter 675, a moisture condensed in the step (m) is removed from the second gas stream after the step (m) (step (o)). The pressure of the second gas stream after the steps (m) and (o) is regulated by means of the second pressure regulator valve 71 (step (k)).

The steps (l) to (o) are continuously carried out at the same time as the foregoing steps (a) to (k) and (p).

The gas production method using the gas production apparatus 600 further comprising the first cooler 664 and the first filter 665, and the second cooler 674 and the second filter 675 is capable of producing oxygen gas and hydrogen gas having further improved purity compared to the gas production method using the gas production apparatus 500.

Figure 7:
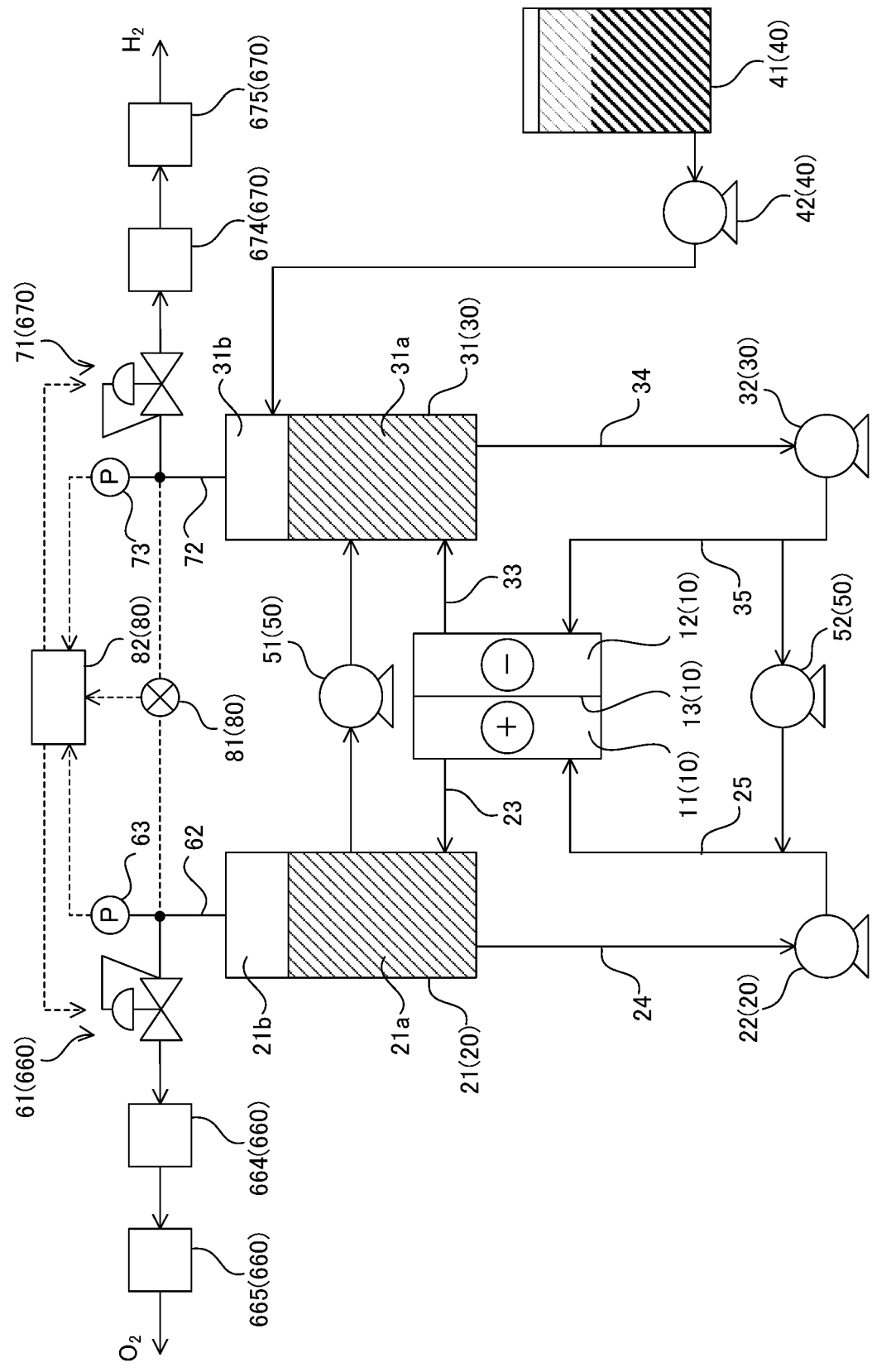
FIG. 7 is an explanatory schematic view of a gas production apparatus 600' according to another embodiment of the present invention.

In the foregoing on the present invention, the gas production apparatus 600 comprising the first cooler 664 and the first filter 665 arranged on the upstream side of the first pressure regulator valve 61, and the second cooler 674 and the second filter 675 arranged on the upstream side of the second pressure regulator valve 71; and the gas production method using this gas production apparatus 600 are described. The present invention is not limited to these embodiments. FIG. 7 is an explanatory schematic view of a gas production apparatus 600' according to another embodiment. In FIG. 7, the components already shown in FIGS. 1 to 6 are given the same reference signs as in FIGS. 1 to 6, and the description thereof may be omitted. The gas production apparatus 600' is different from the gas production apparatus 600 (FIG. 6) in that the gas production apparatus 600' comprises the first cooler 664 and the first filter 665 arranged on the downstream side of the first pressure regulator valve 61, and the second cooler 674 and the second filter 675 arranged on the downstream side of the second pressure regulator valve 71. In the gas production apparatus 600', the first cooler 664 receives and cools the first gas stream flowing out from the secondary side of the first pressure regulator valve 61. The first filter 665 receives the first gas stream cooled by the first cooler 664, and removes a liquefied moisture in the first gas stream. The first gas stream passes through the first cooler 664 and the first filter 665, which results in removal of electrolyte mist and water vapor from the first gas stream. In the gas production apparatus 600', the second cooler 674 receives and cools the second gas stream flowing out from the secondary side of the second pressure regulator valve 71. The second filter 675 receives the second gas stream cooled by the second cooler 674, and removes a liquefied moisture in the second gas stream. The second gas stream passes through the second cooler 674 and the second filter 675, which results in removal of electrolyte mist and water vapor from the second gas stream. The gas production apparatus 600' according to such an embodiment is also capable of producing oxygen gas and hydrogen gas having further improved purity as well as the foregoing gas production apparatus 600. In the gas production apparatus 600', a hydrogen gas removal apparatus to remove hydrogen gas from the first gas stream may be further disposed on the downstream side of the first cooler 664 and the first filter 665, and an oxygen gas removal apparatus to remove oxygen gas from the second gas stream may be further disposed on the downstream side of the second cooler 674 and the second filter 675.

The operation of the gas production apparatus 600', and a gas production method using the gas production apparatus 600' are the same as in the foregoing description on the gas production method using the gas production apparatus 600 except that the first gas stream passes through the first cooler 664 and the first filter 665 after passing through the first pressure regulator valve 61 and the second gas stream passes through the second cooler 674 and the second filter 675 after passing through the second pressure regulator valve 71.

The first gas stream having passed through the first pressure regulator valve 61 is cooled in the first cooler 664 (step (l)). In the first filter 665, a moisture condensed in the step (l) is removed from the first gas stream after the step (l) (step (n)).

The second gas stream having passed through the second pressure regulator valve 71 is cooled in the second cooler 674 (step (m)). In the second filter 675, a moisture condensed in the step (m) is removed from the second gas stream after the step (m) (step (o)).

The steps (l) to (o) are continuously carried out at the same time as the foregoing steps (a) to (k) and (p).

The gas production method using the gas production apparatus 600' is also capable of producing oxygen gas and hydrogen gas having further improved purity compared to the gas production method using the gas production apparatus 500.

<13. Gas Production Apparatus (7)>

In the foregoing on the present invention, the gas production apparatuses 100, 200, 300, 400, 500 and 600 each comprising the electrolyte exchanger 50/250 comprising pumps as the first electrolyte transferor 51/251 and the second electrolyte transferor 52/252, and the gas production methods using the gas production apparatuses according to such embodiments have been mainly described as examples. The present invention is not limited to these embodiments. For example, the gas production apparatus can comprise an electrolyte exchanger having no pump, and the gas production method can use such a gas production apparatus.

Figure 8:
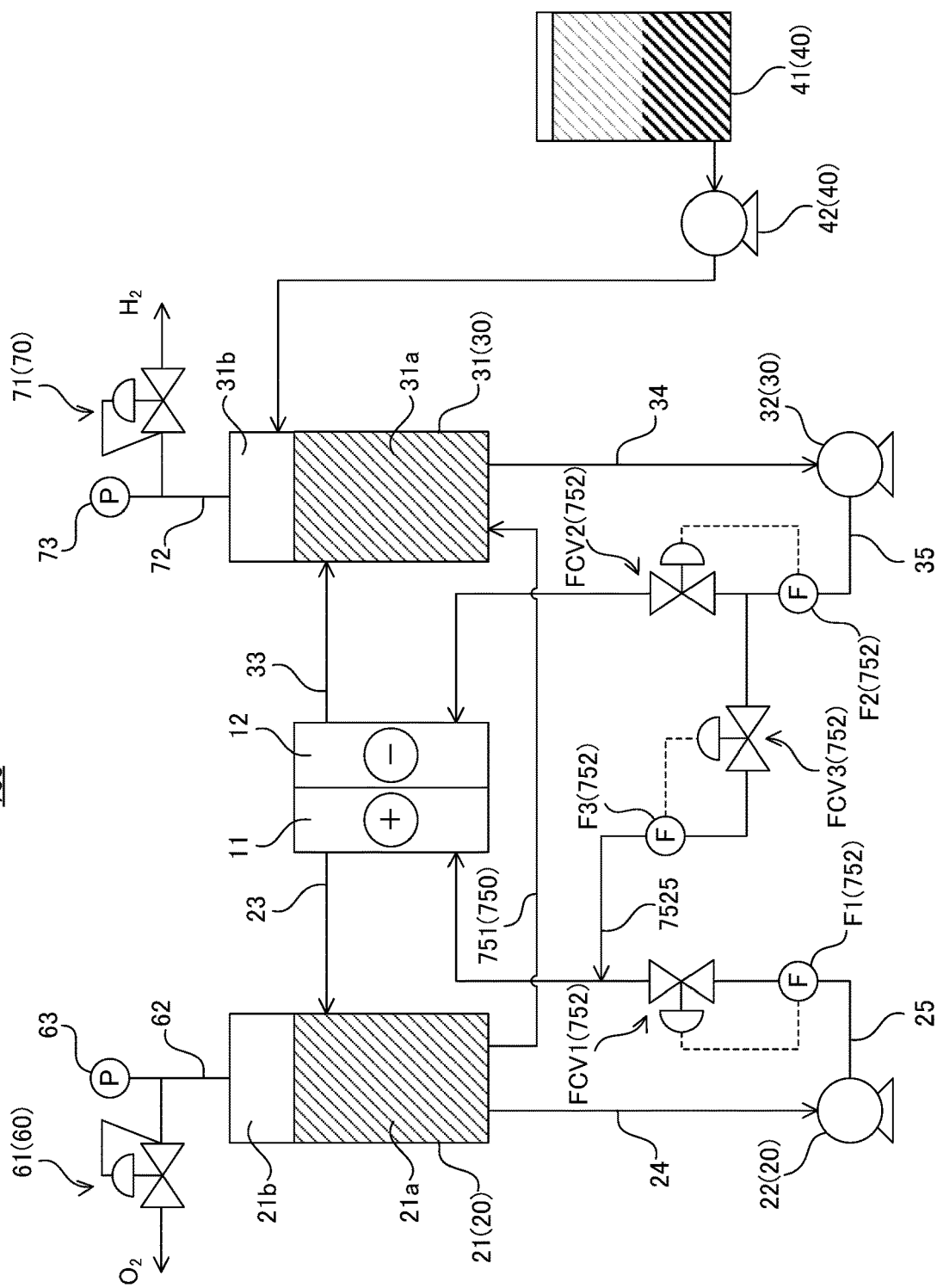
FIG. 8 is an explanatory schematic view of a gas production apparatus 700 according to another embodiment of the present invention.

FIG. 8 is an explanatory schematic view of a gas production apparatus 700 according to such another embodiment. In FIG. 8, the components already shown in FIGS. 1 to 7 are given the same reference signs as in FIGS. 1 to 7, and the description thereof may be omitted. The gas production apparatus 700 is different from the foregoing gas production apparatus 100 (FIG. 1) in that the gas production apparatus 700 comprises an electrolyte exchanger 750 instead of the electrolyte exchanger 50. The electrolyte exchanger 750 is different from the electrolyte exchanger 50 in that the electrolyte exchanger 750 comprises a first electrolyte transferor 751 instead of the first electrolyte transferor 51, and a second electrolyte transferor 752 instead of the second electrolyte transferor 52. In the gas production apparatus 700, a non-positive displacement pump can be preferably used as the first circulation pump 22 and the second circulation pump 32.

For convenience of the description, the second electrolyte transferor 752 is described prior to the first electrolyte transferor 751. The second electrolyte transferor 752 comprises a first flow meter F1 and a first flow control valve FCV1 which are disposed in series on the outlet side of the first circulation pump 22 in the first pipe 25; a second flow meter F2 disposed on the outlet side of the second circulation pump 32 in the second pipe 35; a second flow control valve FCV2 disposed on the downstream side of the second flow meter F2 in the second pipe 35; a third pipe 7525 introducing the electrolyte from the downstream side of the second flow meter F2 and the upstream side of the second flow control valve FCV2 in the second pipe 35 to the downstream side of the first flow meter and the first flow control valve FCV1 in the first pipe 25; and a third flow meter F3 and a third flow control valve FCV3 which are disposed in series in the middle of the third pipe 7525. Any known flow meter capable of measuring the flow rate of an electrolyte, such as area flow meters, positive displacement flow meters, Coriolis flow meters, and electromagnetic flow meters can be used as the first, second and third flow meters F1, F2 and F3 without particular limitations. Any known control valve capable of continuously controlling the opening degree thereof, such as ball valves, butterfly valves, globe valves, and needle valves can be used as the first, second and third flow control valves FCV1, FCV2 and FCV3 without particular limitations. The opening degrees of the first, second and third flow control valves FCV1, FCV2 and FCV3 are each controlled so that the measurement values of the first, second and third flow meters F1, F2 and F3 take predetermined values.

The amount $v_{p1}$ of the electrolyte pumped by the first circulation pump 22 [L/s], the amount $v_{p2}$ of the electrolyte pumped by the second circulation pump 32 [L/s], the amount $v_{21}$ of the electrolyte transferred from the second electrolyte transferor 752 [L/s], the supply $v_1$ of the electrolyte to the anode chamber 11 [L/s], and the supply $v_2$ of the electrolyte to the cathode chamber 12 [L/s] are each represented by $$v_{p1}=f_1 \qquad (24),$$

$$v_{p2}=f_2 \qquad (25),$$

$$v_{21}=f_3 \qquad (26),$$

$$v_1=f_1+f_3 \qquad (27), \text{ and}$$

$$v_2=f_2-f_3 \qquad (28)$$

using the measurement value $f_1$ of the first flow meter F1 [L/s], the measurement value $f_1$ of the second flow meter F2 [L/s], and the measurement value $f_3$ of the third flow meter F3 [L/s]. For example, the target value of $f_3$ can be obtained as $v_{21}$ from the equation (13').

As described above concerning the gas production apparatus 100, the supplies $v_1$ and $v_2$ of the electrolytes to the anode chamber 11 and the cathode chamber 12 are preferably almost equal to each other. Specifically, the amounts $v_{p1}$, $v_{p2}$ and $v_{21}$ of the electrolytes pumped by the first circulation pump 22, the second circulation pump 32, and the second electrolyte transferor 752 are preferably controlled so that the ratio $v_2/v_1$ is 0.80 to 1.20, and more preferably 0.90 to 1.10. The ratio $v_2/v_1$ within the foregoing range stabilizes the difference in the concentration of the electrolyte between the anode chamber 11 and the cathode chamber 12 after electrolysis, which makes it easy to stabilize the electrolysis voltage of the electrolysis vessel 10.

As described above concerning the gas production apparatus 100, the ratios $v_{21}/v_{p1}$ and $v_{21}/v_{p2}$ of the amount $v_{21}$ of the electrolyte transferred by the second electrolyte transferor 752, to the amount $v_{p1}$ of the electrolyte pumped by the first circulation pump 22 and to the amount $v_{p2}$ of the electrolyte pumped by the second circulation pump 32 are each preferably no less than 0.001, and more preferably no less than 0.003; and in one embodiment, are each no more than 0.03, and preferably no more than 0.01. The ratios of the amount of the electrolyte transferred by the second electrolyte transferor 752, to the amount of the electrolyte pumped by the first circulation pump 22 and to the amount of the electrolyte pumped by the second circulation pump 32 each equal to or above the foregoing lower limit can further reduce the difference between the concentration of the electrolyte in the first electrolyte circulation system 20 and the concentration of the electrolyte in the second electrolyte circulation system 30, which makes it easy to keep the concentration of the electrolyte supplied to the anode chamber 11 and the concentration of the electrolyte supplied to the cathode chamber 12 within a range such that power efficiency is high. The ratios of the amount of the electrolyte transferred by the second electrolyte transferor 752, to the amount of the electrolyte pumped by the first circulation pump 22 and to the amount of the electrolyte pumped by the second circulation pump 32 each equal to or below the foregoing upper limit can reduce a remaining dissolved oxygen gas brought together with the electrolyte from the first electrolyte circulation system 20 to the second electrolyte circulation system 30, and a remaining dissolved hydrogen gas brought together with the electrolyte from the second electrolyte circulation system 30 to the first electrolyte circulation system 20, which can reduce hydrogen gas released from the liquid phase part 21a to the gas phase part 21b of the first circulation tank 21 to further improve the purity of oxygen gas recovered from the first gas recovery line 60, and can reduce oxygen gas released from the liquid phase part 31a to the gas phase part 31b of the second circulation tank 31 to further improve the purity of hydrogen gas recovered from the second gas recovery line 70.

If the target values of the supply $v_1$ of the electrolyte to the anode chamber 11 (=$f_1+f_3$: equation (27)), the supply $v_2$ of the electrolyte to the cathode chamber 12 (=$f_2-f_3$: equation (28)), and the amount $v_{21}$ of the electrolyte transferred from the second electrolyte transferor 752 (=$f_1$: equation (26)) are determined, the target values of $f_1$ and $f_2$ are also determined as $$f_1=v_1-v_{21} \qquad (27'), \text{ and}$$

$$f_2=v_2+v_{21} \qquad (28')$$

from the equations (27) and (28), respectively, which makes it possible to control the opening degrees of the first to third flow control valves FCV1, FCV2 and FCV3 so that the target values of $f_1$, $f_2$ and $f_3$ are realized. Any known controlling means such as feedback control can be used for the control of the opening degrees of the first to third flow control valves FCV1, FCV2 and FCV3.

As one example, if the flow rate $f_1$ through the first flow meter F1 and the flow rate $f_2$ through the second flow meter F2 are maintained to be equal to each other, the opening degrees of the first and second flow control valves FCV1 and FCV2 are adjusted so that the pressure drop $P^d_{FCV2}$ at the second flow control valve FCV2 is larger than the pressure drop $P^d_{FCV1}$ at the first flow control valve FCV1 (that is, $P^d_{FCV2}>P^d_{FCV1}$) (for example, when the first and second flow control valves FCV1 and FCV2 have the same specification, the opening degree $O_{FCV1}$ of the first flow control valve FCV1 is set to be larger than the opening degree $O_{FCV2}$ of the second flow control valve FCV2 ($O_{FCV1}>O_{FCV2}$)), which makes it possible to transfer the electrolyte from the second pipe 35 via the third pipe 7525 comprising the third flow control valve FCV3 and the third flow meter F3 to the first pipe 25. In view of transferring the electrolyte against the pressure on the downstream side of the first flow control valve FCV1 in the first pipe 25, the opening degree of the third flow control valve FCV3 is preferably controlled so that the pressure drop $P^d_{FCV3}$ at the third flow control valve FCV3 is smaller than the pressure drop $P^d_{FCV1}$ at the first flow control valve FCV1 ($P^d_{FCV3}<P^d_{FCV1}$). A check valve for checking the electrolyte flowing backward (from the first pipe 25 to the second pipe 35) may be further disposed in the middle of the third pipe 7525.

The first electrolyte transferor 751 is a communicating pipe connecting the liquid phase part 21a of the first circulation tank 21 and the liquid phase part 31a of the second circulation tank 31 (hereinafter the first electrolyte transferor 751 may be referred to as "communicating pipe 751"). In the gas production apparatus 700, the first circulation tank 21 and the second circulation tank 31 are preferably arranged at approximately the same height. As described above, the second electrolyte transferor 752 transfers the part of the second electrolyte flowing in the second pipe 35 connecting the outlet of the second circulation pump 32 and the inlet of the cathode chamber 12 into the first pipe 25 connecting the outlet of the first circulation pump 22 and the inlet of the anode chamber 11. Thus, the second electrolyte transferor 752 operates so as to increase the amount of the first electrolyte stored in the first circulation tank 21 more than the amount of the second electrolyte stored in the second circulation tank 31. Therefore, the part of the first electrolyte stored in the first circulation tank 21 moves via the communicating pipe 751 to the second circulation tank 31, using gravity as driving force, so as to relieve the difference in liquid level between the first circulation tank 21 and the second circulation tank 31. As described above, the first electrolyte transferor 751 transfers the part of the first electrolyte stored in the first circulation tank 21 to the second circulation tank 31.

The amount of the first electrolyte stored in the first circulation tank 21, to the total capacity of the first circulation tank 21 is preferably kept within the range of 1 and 99 vol %, and more preferably within the range of 30 and 70 vol %. Likewise, the amount of the second electrolyte stored in the second circulation tank 31, to the total capacity of the second circulation tank 31 is preferably kept within the range of 1 and 99 vol %, and more preferably within the range of 30 and 70 vol %. The amount of the electrolyte stored in each of the circulation tanks 21 and 31 within the foregoing range makes it possible to more stably operate the gas production apparatus 700.

As described above, the same effect as the foregoing can be also obtained by the gas production apparatus 700 using the combination of the flow control valves (FCV1, FCV2 and FCV3) and the communicating pipe (751) as the electrolyte exchanger instead of the pumps. The gas production apparatus 700 according to such an embodiment can further reduce energy consumption in the electrolyte exchanger, and offers automatic reduction or solution of the difference in liquid level between the first circulation tank 21 and the second circulation tank 31 by means of the communicating pipe 751, which makes a process of controlling the amounts of the electrolytes transferred by the first electrolyte transferor (51, 251) and the second electrolyte transferor (52, 252) to maintain predetermined liquid levels of the first and second circulation tanks 21 and 31, unnecessary. Therefore, the gas production apparatus 700 according to such an embodiment can reduce costs for equipment and driving, and can simplify control.

<14. Gas Production Method (7)>

The operation of the gas production apparatus 700, and a gas production method using the gas production apparatus 700 will be further described with reference to FIG. 8.

The steps (a) to (g), (j) and (k) are the same as in the foregoing description on the gas production method using the gas production apparatus 100 (FIG. 1).

Part of the second electrolyte pumped out by the second circulation pump 32 is branched by the second electrolyte transferor 752 and is joined to the first electrolyte pumped out by the first circulation pump 22. This results in the part of the second electrolyte introduced in the first electrolyte (step (i)). Part of the first electrolyte stored in the first circulation tank 21 is transferred to the second circulation tank 31 by the first electrolyte transferor (communicating pipe) 751. This results in part of the first electrolyte introduced into the second electrolyte (step (h)).

The steps (a) to (k) are continuously carried out at the same time, which results in production of oxygen gas and hydrogen gas. The pure water supply system 40 replenishes water consumed by electrolysis.

The same effect as the foregoing can be also obtained by the gas production apparatus 700 and the gas production method using the gas production apparatus 700.

<15. Gas Production Apparatus (8)>

In the foregoing on the present invention, the gas production apparatus 700 comprising the electrolyte exchanger 750 that comprises the first electrolyte transferor 751 transferring part of the first electrolyte stored in the first circulation tank 21 to the second circulation tank 31, and the second electrolyte transferor 752 transferring part of the second electrolyte flowing in the second pipe 35 connecting the outlet of the second circulation pump 32 and the inlet of the cathode chamber 12, to the first pipe 25 connecting the outlet of the first circulation pump 22 and the inlet of the anode chamber 11; and the gas production method using the gas production apparatus 700 have been described as examples. The present invention is not limited to these embodiments. For example, the gas production apparatus can comprise an electrolyte exchanger which comprises no pump but comprises a first electrolyte transferor transferring part of the second electrolyte stored in the second circulation tank 31 to the first circulation tank 21, and a second electrolyte transferor transferring part of the first electrolyte flowing in the first pipe 25 connecting the outlet of the first circulation pump 22 and the inlet of the anode chamber 12, to the second pipe 35 connecting the outlet of the second circulation pump 32 and the inlet of the cathode chamber 12; and the gas production method can use such a gas production apparatus.

Figure 9:
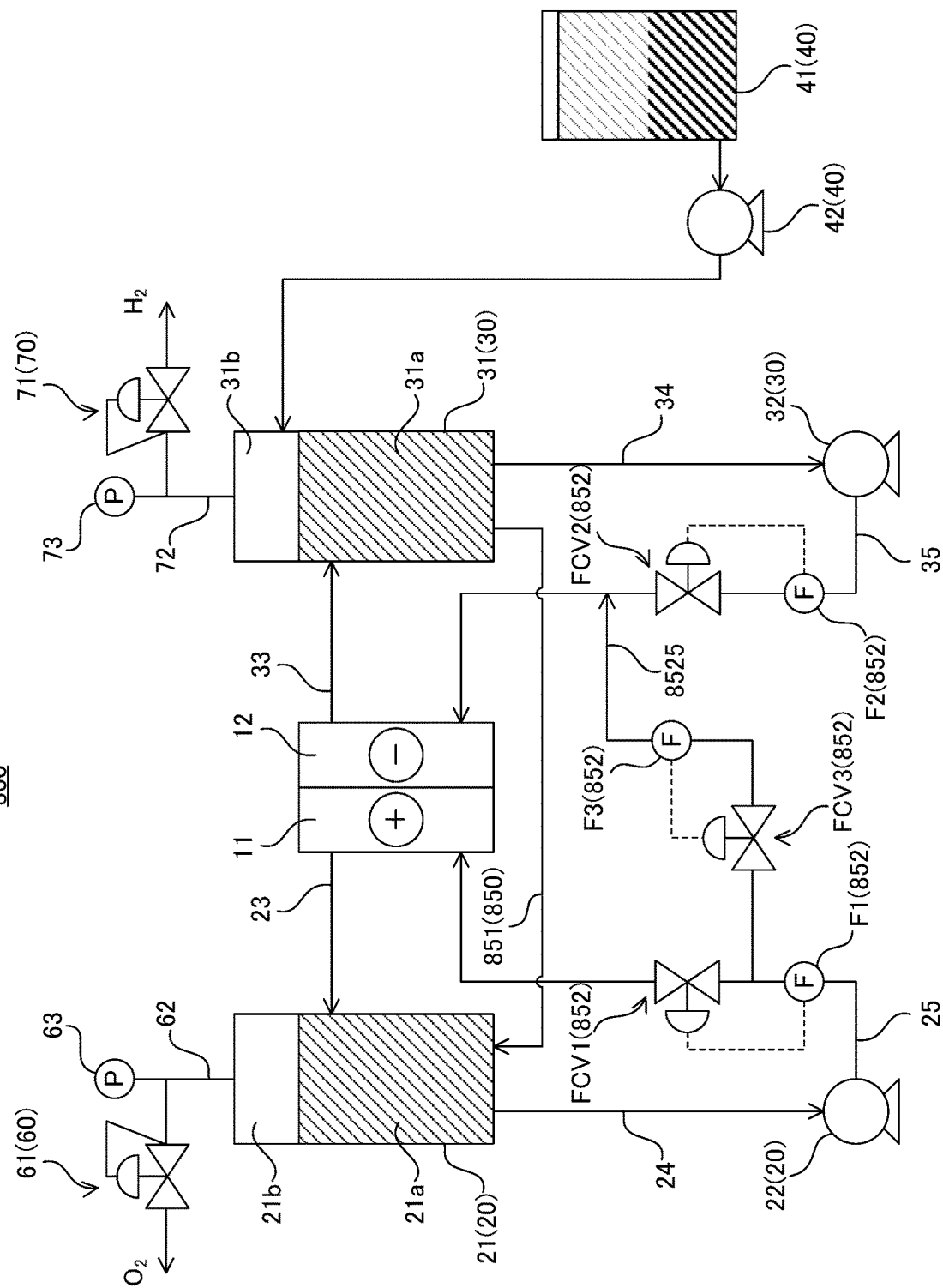
FIG. 9 is an explanatory schematic view of a gas production apparatus 800 according to another embodiment of the present invention.

FIG. 9 is an explanatory schematic view of a gas production apparatus 800 according to such another embodiment. In FIG. 9, the components already shown in FIGS. 1 to 8 are given the same reference signs as in FIGS. 1 to 8, and the description thereof may be omitted. The gas production apparatus 800 is different from the gas production apparatus 200 (FIG. 2) in that the gas production apparatus 800 comprises an electrolyte exchanger 850 instead of the electrolyte exchanger 250. The electrolyte exchanger 850 is different from the electrolyte exchanger 250 in that the electrolyte exchanger 850 comprises a first electrolyte transferor 851 instead of the first electrolyte transferor 251, and a second electrolyte transferor 852 instead of the second electrolyte transferor 252. In the gas production apparatus 800, a non-positive displacement pump can be preferably used as the first circulation pump 22 and the second circulation pump 32.

For convenience of the description, the second electrolyte transferor 852 is described prior to the first electrolyte transferor 851. The second electrolyte transferor 852 has the first flow meter F1 disposed on the outlet side of the first circulation pump 22 in the first pipe 25; the first flow control valve FCV1 disposed on the downstream side of the first flow meter F1 in the first pipe 25; the second flow meter F2 and the second flow control valve FCV2 which are disposed in series on the outlet side of the second circulation pump 32 in the second pipe 35; a third pipe 8525 introducing the electrolyte from the downstream side of the first flow meter F1 and the upstream side of the first flow control valve FCV1 in the first pipe 25 to the downstream side of the second flow meter F2 and the second flow control valve FCV2 in the second pipe 35; and the third flow meter F3 and the third flow control valve FCV3 which are disposed in series in the middle of the third pipe 8525. Any known flow meter capable of measuring the flow rate of an electrolyte, such as area flow meters, positive displacement flow meters, Coriolis flow meters, and electromagnetic flow meters can be used as the first, second and third flow meters F1, F2 and F3 without particular limitations. Any known control valve capable of continuously controlling the opening degree thereof, such as ball valves, butterfly valves, globe valves, and needle valves can be used as the first, second and third flow control valves FCV1, FCV2 and FCV3 without particular limitations. The opening degrees of the first, second and third flow control valves FCV1, FCV2 and FCV3 are each controlled so that the measurement values of the first, second and third flow meters F1, F2 and F3 take predetermined values.

The amount $v_{p1}$ of the electrolyte pumped by the first circulation pump 22 [L/s], the amount $v_{p2}$ of the electrolyte pumped by the second circulation pump 32 [L/s], the amount $v_{12}$ of the electrolyte transferred from the second electrolyte transferor 852 [L/s], the supply $v_1$ of the electrolyte to the anode chamber 11 [L/s], and the supply $v_2$ of the electrolyte to the cathode chamber 12 [L/s] are each represented by $$v_{p1}=f_1 \quad (24),$$

$$v_{p2}=f_2 \quad (25),$$

$$v_{12}=f_3 \quad (29),$$

$$v_1=f_1-f_3 \quad (30), \text{ and}$$

$$v_2=f_2+f_3 \quad (31)$$

using the measurement value $f_1$ of the first flow meter F1 [L/s], the measurement value $f_1$ of the second flow meter F2 [L/s], and the measurement value $f_3$ of the third flow meter F3 [L/s]. For example, the target value of $f_3$ can be obtained as $v_{12}$ from the equation (12').

As described above concerning the gas production apparatus 200, the supplies $v_1$ and $v_2$ of the electrolytes to the anode chamber 11 and the cathode chamber 12 are preferably almost equal to each other. Specifically, the amounts $v_{p1}$, $v_{p2}$ and $v_{12}$ of the electrolytes pumped by the first circulation pump 22, the second circulation pump 32, and the second electrolyte transferor 852 are preferably controlled so that the ratio $v_2/v_1$ is 0.80 to 1.20, and more preferably 0.90 to 1.10. The ratio $v_2/v_1$ within the foregoing range stabilizes the difference in the concentration of the electrolyte between the anode chamber 11 and the cathode chamber 12 after electrolysis, which makes it easy to stabilize the electrolysis voltage of the electrolysis vessel 10.

As described above concerning the gas production apparatus 200, the ratios $v_{12}/v_{p1}$ and $v_{12}/v_{p2}$ of the amount $v_{12}$ of the electrolyte transferred by the second electrolyte transferor 852, to the amount $v_{p1}$ of the electrolyte pumped by the first circulation pump 22 and to the amount $v_{p2}$ of the electrolyte pumped by the second circulation pump 32 are each preferably no less than 0.001, and more preferably no less than 0.003; and in one embodiment, are each no more than 0.03, and preferably no more than 0.01. The ratios of the amount of the electrolyte transferred by the second electrolyte transferor 852, to the amount of the electrolyte pumped by the first circulation pump 22 and to the amount of the electrolyte pumped by the second circulation pump 32 each equal to or above the foregoing lower limit can further reduce the difference between the concentration of the electrolyte in the first electrolyte circulation system 20 and the concentration of the electrolyte in the second electrolyte circulation system 30, which makes it easy to keep the concentration of the electrolyte supplied to the anode chamber 11 and the concentration of the electrolyte supplied to the cathode chamber 12 within a range such that power efficiency is high. The ratios of the amount of the electrolyte transferred by the second electrolyte transferor 852, to the amount of the electrolyte pumped by the first circulation pump 22 and to the amount of the electrolyte pumped by the second circulation pump 32 each equal to or below the foregoing upper limit can reduce a remaining dissolved oxygen gas brought together with the electrolyte from the first electrolyte circulation system 20 to the second electrolyte circulation system 30, and a remaining dissolved hydrogen gas brought together with the electrolyte from the second electrolyte circulation system 30 to the first electrolyte circulation system 20, which can reduce hydrogen gas released from the liquid phase part 21a to the gas phase part 21b of the first circulation tank 21 to further improve the purity of oxygen gas recovered from the first gas recovery line 60, and can reduce oxygen gas released from the liquid phase part 31a to the gas phase part 31b of the second circulation tank 31 to further improve the purity of hydrogen gas recovered from the second gas recovery line 70.

If the target values of the supply $v_1$ of the electrolyte to the anode chamber 11 (=$f_1-f_3$: equation (30)), the supply $v_2$ of the electrolyte to the cathode chamber 12 (=$f_2+f_3$: equation (31)), and the amount $v_{12}$ of the electrolyte transferred from the second electrolyte transferor 852 (=$f_3$: equation (29)) are determined, the target values of $f_1$ and $f_2$ are also determined as $$f_1=v_1+v_{12} \quad (30'), \text{ and}$$

$$f_2=v_2-v_{12} \quad (31')$$

from the equations (30) and (31), respectively, which makes it possible to control the opening degrees of the first to third flow control valves FCV1, FCV2 and FCV3 so that the target values of $f_1$, $f_2$ and $f_3$ are realized. Any known controlling means such as feedback control can be used for the control of the opening degrees of the first to third flow control valves FCV1, FCV2 and FCV3.

As one example, if the flow rate $f_1$ through the first flow meter F1 and the flow rate $f_2$ through the second flow meter F2 are maintained to be equal to each other, the opening degrees of the first and second flow control valves FCV1 and FCV2 are adjusted so that the pressure drop $P^d_{FCV2}$ at the second flow control valve FCV2 is smaller than the pressure drop $P^d_{FCV1}$ at the first flow control valve FCV1 (that is, $P^d_{FCV2}<P^d_{FCV1}$) (for example, when the first and second flow control valves FCV1 and FCV2 have the same specification, the opening degree $O_{FCV1}$ of the first flow control valve FCV1 is set to be smaller than the opening degree $O_{FCV2}$ of the second flow control valve FCV2 ($O_{FCV1}<O_{FCV2}$)), which makes it possible to transfer the electrolyte from the first pipe 25 via the third pipe 8525 comprising the third flow control valve FCV3 and the third flow meter F3 to the second pipe 35. In view of transferring the electrolyte against the pressure on the downstream side of the second flow control valve FCV2 in the second pipe 35, the opening degree of the third flow control valve FCV3 is preferably controlled so that the pressure drop $P^d_{FCV3}$ at the third flow control valve FCV3 is smaller than the pressure drop $P^d_{FCV2}$ at the second flow control valve FCV2 ($P^d_{FCV3}<P^d_{FCV2}$). A check valve for checking the electrolyte flowing backward (from the second pipe 35 to the first pipe 25) may be further disposed in the middle of the third pipe 8525.

The first electrolyte transferor 851 is a communicating pipe connecting the liquid phase part 21a of the first circulation tank 21 and the liquid phase part 31a of the second circulation tank 31 (hereinafter the first electrolyte transferor 851 may be referred to as "communicating pipe 851"). In the gas production apparatus 800, the first circulation tank 21 and the second circulation tank 31 are preferably arranged at approximately the same height. As described above, the second electrolyte transferor 852 transfers part of the first electrolyte flowing in the first pipe 25 connecting the outlet of the first circulation pump 22 and the inlet of the anode chamber 11 to the second pipe 35 connecting the outlet of the second circulation pump 32 and the inlet of the cathode chamber 12. Thus, the second electrolyte transferor 852 operates so as to increase the amount of the second electrolyte stored in the second circulation tank 31 more than the amount of the first electrolyte stored in the first circulation tank 21. Therefore, the second electrolyte stored in the second circulation tank 31 partially moves via the communicating pipe 851 to the first circulation tank 21, using gravity as driving force, so as to relieve the difference in liquid level between the first circulation tank 21 and the second circulation tank 31. As described above, the first electrolyte transferor 851 transfers part of the second electrolyte stored in the second circulation tank 31 to the first circulation tank 21.

The amount of the first electrolyte stored in the first circulation tank 21, to the total capacity of the first circulation tank 21 is preferably kept within the range of 1 and 99 vol %, and more preferably within the range of 30 and 70 vol %. Likewise, the amount of the second electrolyte stored in the second circulation tank 31, to the total capacity of the second circulation tank 31 is preferably kept within the range of 1 and 99 vol %, and more preferably within the range of 30 and 70 vol %. The amount of the electrolyte stored in each of the circulation tanks 21 and 31 within the foregoing range makes it possible to more stably operate the gas production apparatus 800.

As described above, the same effect as the foregoing can be also obtained by the gas production apparatus 800 using the combination of the control valves (FCV1 to FCV3) and the communicating pipe (851) as the electrolyte exchanger instead of the pumps. The gas production apparatus 800 according to such an embodiment can further reduce energy consumption in the electrolyte exchanger, and offers automatic reduction or solution of the difference in liquid level between the first circulation tank 21 and the second circulation tank 31 by means of the communicating pipe 851, which makes a process of controlling the amounts of the electrolytes transferred from the first electrolyte transferor (51, 251) and the second electrolyte transferor (52, 252) to maintain predetermined liquid levels of the first and second circulation tanks 21 and 31, unnecessary. Therefore, the gas production apparatus 800 according to such an embodiment can reduce costs for equipment and driving, and can simplify control.

<16. Gas Production Method (8)>

The operation of the gas production apparatus 800, and a gas production method using the gas production apparatus 800 will be further described with reference to FIG. 9.

The steps (a) to (g), (j) and (k) are the same as in the foregoing description on the gas production method using the gas production apparatus 500 (FIG. 2).

Part of the first electrolyte pumped out by the first circulation pump 22 is branched by the second electrolyte transferor 852 and is joined to the second electrolyte pumped out by the second circulation pump 32. This results in the part of the first electrolyte introduced in the second electrolyte (step (i)). Part of the second electrolyte stored in the second circulation tank 31 is transferred to the first circulation tank 21 by the first electrolyte transferor (communicating pipe) 851. This results in part of the second electrolyte introduced into the first electrolyte (step (h)).

The steps (a) to (k) are continuously carried out at the same time, which results in production of oxygen gas and hydrogen gas. The pure water supply system 40 replenishes water consumed by electrolysis.

The same effect as the foregoing can be also obtained by the gas production apparatus 800 and the gas production method using the gas production apparatus 800.

In the foregoing on the present invention, the gas production apparatuses 100, 200, 300, 400, 500, 600, 700 and 800 each comprising the pure water supply system 40 or 340 supplying water to either one of the first circulation tank 21 and the second circulation tank 31; and the gas production methods using such gas production apparatuses have been described as examples. The present invention is not limited to these embodiments. For example, the gas production apparatus can comprise a pure water supply system supplying water to both the first circulation tank and the second circulation tank, and the gas production method can use such a gas production apparatus.

In the foregoing on the present invention, the gas production apparatuses 100, 200, 300, 400, 500, 600, 700 and 800 each comprising no gas-liquid separator, where the first gas stream and the first electrolyte are subjected to gas-liquid separation inside the first circulation tank 21, and the second gas stream and the second electrolyte are subjected to gas-liquid separation inside the second circulation tank 31; and the gas production method using such gas production apparatuses have been described as examples. The present invention is not limited to these embodiments. For example, the gas production apparatus can comprise a first gas-liquid separator receiving the gas-liquid mixture of the first gas stream and the first electrolyte which flows out from the anode chamber, and subjecting gas-liquid separation to the gas-liquid mixture, and a second gas-liquid separator receiving the gas-liquid mixture of the second gas stream and the second electrolyte which flows out from the cathode chamber, and subjecting gas-liquid separation to the gas-liquid mixture, where the first electrolyte after the gas-liquid separation by the first gas-liquid separator is stored in the first circulation tank, the first gas stream after the gas-liquid separation by the first gas-liquid separator is recovered from the first gas recovery line, the second electrolyte after the gas-liquid separation by the second gas-liquid separator is stored in the second circulation tank, and the second gas stream after the gas-liquid separation by the second gas-liquid separator is recovered from the second gas recovery line; and the gas production method can use such a gas production apparatus. The same effect as the foregoing can be also obtained by the gas production apparatus and the gas production method according to such an embodiment.

REFERENCES SIGN LIST 100, 200, 300, 400, 500, 600, 600', 700, 800 gas production apparatus
10 electrolysis vessel
11 anode chamber
12 cathode chamber
13 (ion-permeable) separating membrane
20 first electrolyte circulation system
21 first circulation tank
21a liquid phase part
21b gas phase part
22 first circulation pump
23, 24 pipe
25 first pipe
30 second electrolyte circulation system
31 second circulation tank
31a liquid phase part
31b gas phase part
32 second circulation pump
33, 34 pipe
35 second pipe
40 pure water supply system
41 pure water tank
42 water supply pump
50, 250, 750, 850 electrolyte exchanger
51, 251, 751, 851 first electrolyte transferor
52, 252, 752, 852 second electrolyte transferor
7525, 8525 third pipe F1 first flow meter
F2 second flow meter
F3 third flow meter
FCV1 first flow control valve
FCV2 second flow control valve
FCV3 third flow control valve
60, 660 first gas recovery line
61 first pressure regulator valve
62 pipe
63 manometer
664 first cooler
665 first filter
70, 670 second gas recovery line
71 second pressure regulator valve
72 pipe
73 manometer
674 second cooler
675 second filter
80 differential pressure regulator
81 differential pressure detector
82 valve controller

We claim:

1. A gas production apparatus comprising:
an electrolysis vessel comprising an anode chamber, a cathode chamber, and an ion-permeable separator membrane separating the anode chamber and the cathode chamber, the anode chamber housing an anode and generating oxygen gas, the cathode chamber housing a cathode and generating hydrogen gas;
a first electrolyte circulation system;
a second electrolyte circulation system; and
an electrolyte exchanger,
the first electrolyte circulation system comprising:
    a first circulation tank receiving and storing a first electrolyte flowing out from the anode chamber; and
    a first circulation pump supplying the first electrolyte stored in the first circulation tank to the anode chamber,
the second electrolyte circulation system comprising:
    a second circulation tank receiving and storing a second electrolyte flowing out from the cathode chamber; and
    a second circulation pump supplying the second electrolyte stored in the second circulation tank to the cathode chamber,
the electrolyte exchanger transferring part of the first electrolyte existing in the first electrolyte circulation system into the second electrolyte circulation system on one hand, and transferring part of the second electrolyte existing in the second electrolyte circulation system into the first electrolyte circulation system on the other hand,
the gas production apparatus further comprising:
a first pipe connecting an outlet of the first circulation pump and an inlet of the anode chamber; and
a second pipe connecting an outlet of the second circulation pump and an inlet of the cathode chamber, the second electrolyte flowing in the second pipe,
the electrolyte exchanger comprising either (a) or (b):
(a) a first electrolyte transferor transferring part of the first electrolyte stored in the first circulation tank into the second circulation tank; and
a second electrolyte transferor transferring part of the second electrolyte from the second pipe into the first pipe; or (b) a first electrolyte transferor transferring part of the second electrolyte stored in the second circulation tank into the first circulation tank; and
a second electrolyte transferor transferring part of the first electrolyte from the first pipe into the second pipe.

2. The gas production apparatus according to claim 1, further comprising:
a first pressure regulator valve regulating a pressure of a first gas stream flowing out from the anode chamber; and
a second pressure regulator valve regulating a pressure of a second gas stream flowing out from the cathode chamber.

3. The gas production apparatus according to claim 2, further comprising:
a first cooler receiving and cooling the first gas stream;
a second cooler receiving and cooling the second gas stream;
a first filter being connected with the first cooler, receiving the first gas stream cooled by the first cooler, and removing a liquefied moisture in the first gas stream; and
a second filter being connected with the second cooler, receiving the second gas stream cooled by the second cooler, and removing a liquefied moisture in the second gas stream,
wherein the first cooler and the first filter are arranged on an upstream side of the first pressure regulator valve; and
the second cooler and the second filter are arranged on an upstream side of the second pressure regulator valve.

4. The gas production apparatus according to claim 2, further comprising:
a differential pressure regulator regulating a pressure difference between the pressure of the first gas stream on the upstream side of the first pressure regulator valve and the pressure of the second gas stream on the upstream side of the second pressure regulator valve to a predetermined value.

5. The gas production apparatus according to claim 4, the differential pressure regulator comprising:
a differential pressure detector measuring the pressure difference between the pressure of the first gas stream on the upstream side of the first pressure regulator valve and the pressure of the second gas stream on the upstream side of the second pressure regulator valve; and
a valve controller controlling the first pressure regulator valve and/or the second pressure regulator valve based on a result of the measurement by the differential pressure detector.

6. A gas production method for producing oxygen gas and hydrogen gas, the method comprising electrolyzing an electrolyte which is an alkaline water by means of an electrolysis vessel, the electrolysis vessel comprising an anode chamber, a cathode chamber, and an ion-permeable separator membrane separating the anode chamber and the cathode chamber, the anode chamber housing an anode and generating oxygen gas, the cathode chamber housing a cathode and generating hydrogen gas,
the method comprising:
(a) applying an electric current between the anode and the cathode while supplying a first electrolyte to the anode chamber and a second electrolyte to the cathode chamber respectively, to generate oxygen gas from the anode and hydrogen gas from the cathode respectively;

(b) recovering a first gas stream and the first electrolyte from the anode chamber, the first gas stream comprising oxygen gas;
(c) recovering a second gas stream and the second electrolyte from the cathode chamber, the second gas stream comprising hydrogen gas;
(d) storing the first electrolyte recovered from the anode chamber in a first circulation tank;
(e) storing the second electrolyte recovered from the cathode chamber in a second circulation tank;
(f) pumping the first electrolyte stored in the first circulation tank to the anode chamber by means of a first circulation pump;
(g) pumping the second electrolyte stored in the second circulation tank to the cathode chamber by means of a second circulation pump;
(h) introducing part of the first electrolyte into the second electrolyte; and
(i) introducing part of the second electrolyte into the first electrolyte,
wherein either (a) or (b):
(a) the (h) comprises transferring part of the first electrolyte stored in the first circulation tank into the second circulation tank; and
the (i) comprises making part of the second electrolyte pumped out from the second circulation pump join the first electrolyte pumped out from the first circulation pump; or
(b) the (h) comprises making part of the first electrolyte pumped out from the first circulation pump join the second electrolyte pumped out from the second circulation pump; and
the (i) comprises transferring part of the second electrolyte stored in the second circulation tank into the first circulation tank.

7. The method according to claim 6, further comprising:
(j) regulating a pressure of the first gas stream recovered from the anode chamber, by means of a first pressure regulator valve arranged in a flow path of the first gas stream; and
(k) regulating a pressure of the second gas stream recovered from the cathode chamber, by means of a second pressure regulator valve arranged in a flow path of the second gas stream.

8. The method according to claim 7, further comprising:
(l) cooling the first gas stream;
(m) cooling the second gas stream;
(n) removing a moisture condensed in the (l) from the first gas stream after the (l); and
(o) removing a moisture condensed in the (m) from the second gas stream after the (m),
the (j) comprising:
regulating the pressure of the first gas stream after the (l) and the (n) by means of the first pressure regulator valve,
the (k) comprising:
regulating the pressure of the second gas steam after the (m) and the (o) by means of the second pressure regulator valve.

9. The method according to claim 7, further comprising:
(p) regulating a pressure difference between the pressure of the first gas stream on an upstream side of the first pressure regulator valve and the pressure of the second gas stream on an upstream side of the second pressure regulator valve to be a predetermined value.

10. The method according to claim 9,
the (p) comprising:
(p1) measuring the pressure difference between the pressure of the first gas stream on the upstream side of the first pressure regulator valve and the pressure of the second gas stream on the upstream side of the second pressure regulator valve; and
(p2) controlling the first pressure regulator valve and/or the second pressure regulator valve in the (j) and (k), based on a result of the measurement of the (p1).

11. The method according to claim 6,
wherein a pressure inside the cathode chamber is maintained higher than an atmospheric pressure by no less than 20 kPa.

12. The method according to claim 6,
wherein a pressure inside the anode chamber is maintained higher than an atmospheric pressure by no less than 20 kPa.

13. The method according to claim 11,
wherein a pressure inside the anode chamber is maintained higher than an atmospheric pressure by no less than 20 kPa.

* * * * *